(12) United States Patent
Brandmaier et al.

(10) Patent No.: US 10,878,507 B1
(45) Date of Patent: *Dec. 29, 2020

(54) FEEDBACK LOOP IN MOBILE DAMAGE ASSESSMENT AND CLAIMS PROCESSING

(71) Applicant: Allstate Insurance Company, Northbrook, IL (US)

(72) Inventors: Jennifer A. Brandmaier, Chicago, IL (US); Mark E. Faga, Evanston, IL (US); Robert H. Johnson, Hoffman Estates, IL (US); Daniel Koza, Hinsdale, IL (US); William Loo, Arlington Heights, IL (US); Clint J. Marlow, Barrington, IL (US); Kurt M. Stricker, Northfield, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,602

(22) Filed: Mar. 27, 2015

Related U.S. Application Data

(63) Continuation of application No. 13/587,635, filed on Aug. 16, 2012, now Pat. No. 10,430,885.

(51) Int. Cl.
*G06Q 40/08* (2012.01)
*G06K 9/00* (2006.01)

(52) U.S. Cl.
CPC ......... *G06Q 40/08* (2013.01); *G06K 9/00791* (2013.01)

(58) Field of Classification Search
CPC .............................. G06Q 40/00; G06Q 40/08
(Continued)

(56) References Cited

U.S. PATENT DOCUMENTS

| 4,899,292 A | 2/1990 | Montagna et al. |
| 5,128,859 A | 7/1992 | Carbone et al. |

(Continued)

FOREIGN PATENT DOCUMENTS

| CN | 1828336 | * | 9/2006 |
| EP | 1215612 A1 | | 6/2002 |

(Continued)

OTHER PUBLICATIONS

Mort et al. "Marketing m-services: Establishing a usage benefit typology related to mobile user characteristics" Jul. 2005, Journal of Database Marketing & Customer Strategy Management, vol. 12, Issue 4, pp. 327-341 (Year: 2005).*

(Continued)

*Primary Examiner* — Kelly S Campen
(74) *Attorney, Agent, or Firm* — Banner & Witcoff, Ltd.

(57) ABSTRACT

Systems and methods provide for an automated system for analyzing damage and processing claims associated with an insured item, such as a vehicle. An enhanced claims processing server may analyze damage associated with the insured item using photos/video transmitted to the server from a user device (e.g., a mobile device). The mobile device may receive feedback from the server regarding the acceptability of submitted photos/video, and if the server determines that any of the submitted photos/video is unacceptable, the mobile device may capture additional photos/video until all of the data are deemed acceptable. To aid in damage analysis, the server may also interface with various internal and external databases storing reference images of undamaged items and cost estimate information for repairing previously analyzed damages to similar items. Further still, the server may generate a payment for compensating a claimant for repair of the insured item.

17 Claims, 13 Drawing Sheets

(58) Field of Classification Search
USPC .................. 705/4; 703/8; 702/108; 707/705
See application file for complete search history.

(56) References Cited

U.S. PATENT DOCUMENTS

| | | | |
|---|---|---|---|
| 5,317,503 A | 5/1994 | Inoue | |
| 5,432,904 A | 7/1995 | Wong | |
| 5,504,674 A | 4/1996 | Chen et al. | |
| 5,950,169 A | 9/1999 | Borghesi et al. | |
| 6,141,611 A * | 10/2000 | Mackey | G07C 5/008 |
| | | | 340/438 |
| 6,185,540 B1 | 2/2001 | Schreitmueller et al. | |
| 7,092,369 B2 | 8/2006 | Fuccello et al. | |
| 7,197,444 B2 | 3/2007 | Bomar, Jr. et al. | |
| 7,203,654 B2 | 4/2007 | Menendez | |
| 7,263,493 B1 | 8/2007 | Provost et al. | |
| 7,324,951 B2 * | 1/2008 | Renwick | G06Q 40/08 |
| | | | 705/4 |
| 7,346,523 B1 | 3/2008 | Provost et al. | |
| 7,432,938 B1 | 10/2008 | Reuter et al. | |
| 7,586,654 B2 | 9/2009 | Hoberock | |
| 7,702,529 B2 | 4/2010 | Wahlbin et al. | |
| 7,734,485 B1 | 6/2010 | Bohanek | |
| 7,809,587 B2 * | 10/2010 | Dorai | G06Q 40/08 |
| | | | 703/6 |
| 7,873,710 B2 | 1/2011 | Kiley et al. | |
| 7,889,931 B2 | 2/2011 | Webb et al. | |
| 7,953,615 B2 | 5/2011 | Aquila et al. | |
| 7,962,485 B1 | 6/2011 | Trandal et al. | |
| 8,005,720 B2 | 8/2011 | King et al. | |
| 8,015,036 B1 * | 9/2011 | Leisure | G06Q 10/10 |
| | | | 705/1.1 |
| 8,019,629 B1 | 9/2011 | Medina, III et al. | |
| 8,035,639 B2 | 10/2011 | Witte | |
| 8,081,795 B2 | 12/2011 | Brown | |
| 8,095,394 B2 * | 1/2012 | Nowak | G06Q 40/08 |
| | | | 250/363.04 |
| 8,239,220 B2 * | 8/2012 | Kidd | G01M 17/0078 |
| | | | 705/305 |
| 8,306,258 B2 | 11/2012 | Brown | |
| 8,510,196 B1 | 8/2013 | Brandmaier et al. | |
| 8,554,587 B1 | 10/2013 | Nowak et al. | |
| 8,650,106 B1 | 2/2014 | Hopkins, III | |
| 8,712,893 B1 * | 4/2014 | Brandmaier | G06F 16/51 |
| | | | 705/35 |
| 9,137,417 B2 | 9/2015 | Macciola et al. | |
| 9,824,453 B1 | 11/2017 | Collins et al. | |
| 9,846,915 B2 | 12/2017 | Howe et al. | |
| 9,970,881 B1 | 5/2018 | Hillman et al. | |
| 10,332,209 B1 | 6/2019 | Brandmaier et al. | |
| 10,373,262 B1 | 8/2019 | Haller, Jr. et al. | |
| 10,373,387 B1 | 8/2019 | Fields et al. | |
| 10,380,696 B1 | 8/2019 | Haller, Jr. et al. | |
| 10,430,885 B1 | 10/2019 | Brandmaier et al. | |
| 10,430,886 B1 | 10/2019 | Brandmaier et al. | |
| 10,572,944 B1 | 2/2020 | Brandmaier et al. | |
| 10,573,012 B1 | 2/2020 | Collins et al. | |
| 10,580,075 B1 | 3/2020 | Brandmaier et al. | |
| 10,621,675 B1 | 4/2020 | Genser et al. | |
| 10,650,617 B2 | 5/2020 | Schmitt et al. | |
| 2002/0002475 A1 * | 1/2002 | Freedman | G06Q 40/02 |
| | | | 705/4 |
| 2002/0055861 A1 * | 5/2002 | King | G06Q 10/10 |
| | | | 705/4 |
| 2002/0161533 A1 | 10/2002 | Uegaki | |
| 2002/0188479 A1 * | 12/2002 | Renwick | G06Q 40/08 |
| | | | 705/4 |
| 2003/0219169 A1 | 11/2003 | Sartor et al. | |
| 2004/0064345 A1 | 4/2004 | Ajamian et al. | |
| 2004/0153346 A1 | 8/2004 | Grundel et al. | |
| 2005/0125127 A1 | 6/2005 | Bomar et al. | |
| 2005/0228683 A1 | 10/2005 | Saylor et al. | |
| 2005/0246108 A1 | 11/2005 | Fournier | |
| 2005/0251427 A1 | 11/2005 | Dorai et al. | |
| 2006/0029296 A1 | 2/2006 | King et al. | |
| 2006/0080154 A1 | 4/2006 | Larsen | |
| 2006/0098899 A1 | 5/2006 | King et al. | |
| 2008/0052134 A1 * | 2/2008 | Nowak | G06Q 10/10 |
| | | | 705/4 |
| 2008/0059238 A1 | 3/2008 | Park et al. | |
| 2008/0255887 A1 * | 10/2008 | Gruter | G06Q 40/08 |
| | | | 705/4 |
| 2008/0267487 A1 | 10/2008 | Siri | |
| 2009/0018859 A1 | 1/2009 | Purifoy et al. | |
| 2009/0018874 A1 | 1/2009 | Blair et al. | |
| 2009/0100106 A1 | 4/2009 | Anthony et al. | |
| 2009/0138290 A1 | 5/2009 | Holden | |
| 2009/0147988 A1 | 6/2009 | Jones et al. | |
| 2009/0234678 A1 | 9/2009 | Arenas | |
| 2009/0265193 A1 | 10/2009 | Collins et al. | |
| 2010/0036683 A1 | 2/2010 | Logan | |
| 2010/0066012 A1 | 3/2010 | Yamazaki et al. | |
| 2010/0088123 A1 | 4/2010 | McCall et al. | |
| 2010/0138298 A1 | 6/2010 | Fitzgerald et al. | |
| 2010/0174564 A1 | 7/2010 | Stender et al. | |
| 2010/0183246 A1 | 7/2010 | King et al. | |
| 2011/0040692 A1 | 2/2011 | Ahroon | |
| 2011/0054806 A1 | 3/2011 | Goldfine et al. | |
| 2011/0085211 A1 | 4/2011 | King et al. | |
| 2011/0161100 A1 | 6/2011 | Peak et al. | |
| 2011/0161116 A1 | 6/2011 | Peak et al. | |
| 2011/0161117 A1 | 6/2011 | Busque et al. | |
| 2011/0161118 A1 | 6/2011 | Borden et al. | |
| 2011/0196707 A1 | 8/2011 | Danico et al. | |
| 2011/0213628 A1 | 9/2011 | Peak et al. | |
| 2011/0218825 A1 | 9/2011 | Hertenstein | |
| 2011/0270641 A1 | 11/2011 | Rossmark et al. | |
| 2011/0313936 A1 | 12/2011 | Sieger | |
| 2011/0313951 A1 | 12/2011 | Cook | |
| 2012/0066012 A1 | 3/2012 | Brown | |
| 2012/0290333 A1 | 11/2012 | Birchall | |
| 2012/0297337 A1 | 11/2012 | St. Denis et al. | |
| 2013/0100306 A1 | 4/2013 | Bekiares et al. | |
| 2013/0297353 A1 | 11/2013 | Strange et al. | |
| 2013/0317861 A1 | 11/2013 | Tofte et al. | |
| 2014/0032430 A1 | 1/2014 | Sieger | |
| 2014/0122133 A1 * | 5/2014 | Weisberg | G06Q 40/08 |
| | | | 705/4 |
| 2014/0229207 A1 * | 8/2014 | Swamy | G06K 9/4604 |
| | | | 705/4 |
| 2014/0327940 A1 | 11/2014 | Amtrup et al. | |
| 2015/0073864 A1 | 3/2015 | Labrie et al. | |
| 2015/0294419 A1 | 10/2015 | Gonzalez Miranda et al. | |
| 2015/0348204 A1 * | 12/2015 | Daues | G06Q 40/08 |
| | | | 705/4 |
| 2015/0363717 A1 * | 12/2015 | Lim | G06Q 10/0633 |
| | | | 705/4 |
| 2017/0111532 A1 | 4/2017 | Amtrup et al. | |
| 2017/0116494 A1 | 4/2017 | Isaev | |
| 2017/0270612 A1 | 9/2017 | Howe et al. | |
| 2017/0270650 A1 | 9/2017 | Howe et al. | |
| 2017/0293894 A1 | 10/2017 | Taliwal et al. | |
| 2017/0330207 A1 | 11/2017 | Labrie et al. | |
| 2017/0364159 A1 | 12/2017 | Eronen et al. | |
| 2018/0260793 A1 | 9/2018 | Li et al. | |
| 2019/0019295 A1 | 1/2019 | Lehtiniemi et al. | |
| 2020/0065632 A1 | 2/2020 | Guo et al. | |

FOREIGN PATENT DOCUMENTS

| | | | |
|---|---|---|---|
| JP | 2000050156 | * | 2/2000 |
| JP | 2010157267 A | | 7/2010 |
| KR | 2002008466 A | | 1/2002 |
| KR | 2006031208 A | | 4/2006 |
| WO | 2010026170 A1 | | 3/2010 |
| WO | 2011157064 A1 | | 12/2011 |
| WO | 2012113084 A1 | | 8/2012 |
| WO | 2013003957 A1 | | 1/2013 |

(56) References Cited

OTHER PUBLICATIONS

Ying Li et al. "Applying Image Analysis to Auto Insurance Triage: A Novel Application" Oct. 1-3, 2007. Institute of Electrical and Electronics Engineers, MMSP 2007 Proceedings, Chania, Crete, Greece. pp. 280-283 (Year: 2007).*
DiTullio, Angelo."How Can We Stop Insurers Writing Estimates from Photos." Apr. 19, 2016. through Babcox Media, Inc. BodyShop Business 35.4/ Magazine/Journal 2 pages. (Year: 2016).*
Nov. 4, 2016—U.S. Final Office Action—U.S. Appl. No. 13/834,170.
Nov. 10, 2016—U.S. Non-Final Office Action—U.S. Appl. No. 14/063,533.
Nov. 25, 2016—U.S. Non-Final Office Action—U.S. Appl. No. 14/671,617.
Oct. 17, 2016—U.S. Final Office Action—U.S. Appl. No. 13/892,598.
Dec. 2, 2016—U.S. Final Office Action—U.S. Appl. No. 13/834,210.
Dec. 2, 2016—U.S. Final Office Action—U.S. Appl. No. 14/190,976.
Dec. 2, 2016—U.S. Non-Final Office Action—U.S. Appl. No. 14/269,387.
Feb. 7, 2017—U.S. Non-Final Office Action—U.S. Appl. No. 13/587,635.
Mar. 13, 2017—U.S. Final Office Action—U.S. Appl. No. 14/269,387.
Mar. 29, 2017—U.S. Final Office Action—U.S. Appl. No. 13/834,193.
Mar. 30, 2017—U.S. Final Office Action—U.S. Appl. No. 14/063,533.
Mar. 31, 2017—U.S. Final Office Action—U.S. Appl. No. 14/063,517.
Apr. 6, 2017—U.S. Final Office Action—U.S. Appl. No. 13/933,576.
Apr. 5, 2017—U.S. Non-Final Office Action—U.S. Appl. No. 13/892,598.
May 9, 2017—U.S. Non-Final Office Action—U.S. Appl. No. 13/587,630.
May 18, 2017—U.S. Final Office Action—U.S. Appl. No. 14/671,617.
May 24, 2017—U.S. Non-Final Office Action—U.S. Appl. No. 14/063,517.
Jul. 10, 2017—U.S. Non-Final Office Action—U.S. Appl. No. 14/190,976.
Aug. 22, 2017—U.S. Final Office Action—U.S. Appl. No. 13/587,635.
Sep. 13, 2017—U.S. Final Office Action—U.S. Appl. No. 14/063,517.
Sep. 18, 2017—U.S. Final Office Action—U.S. Appl. No. 13/892,598.
Sep. 25, 2017—U.S. Non-Final Office Action—U.S. Appl. No. 13/834,170.
Sep. 25, 2017—U.S. Non-Final Office Action—U.S. Appl. No. 13/834,161.
Dec. 1, 2017—U.S. Non-Final Office Action—U.S. Appl. No. 13/933,576.
Dec. 7, 2017—U.S. Non-Final Office Action—U.S. Appl. No. 14/671,617.
Dec. 8, 2017—U.S. Non-Final Office Action—U.S. Appl. No. 14/063,570.
Jan. 9, 2018—U.S. Non-Final Office Action—U.S. Appl. 13/892,598.
Jan. 12, 2018—U.S. Final Office Action—U.S. Appl. No. 13/834,161.
Mar. 12, 2018—U.S. Non-Final Office Action—U.S. Appl. No. 14/063,517.
Mar. 9, 2018—U.S. Final Office Action—U.S. Appl. No. 14/269,387.
Mar. 14, 2018—U.S. Final Office Action—U.S. Appl. No. 13/834,170.
Mar. 14, 2018—U.S. Final Office Action—U.S. Appl. No. 13/834,210.
Mar. 16, 2018—U.S. Final Office Action—U.S. Appl. No. 14/063,570.
Mar. 16, 2018—U.S. Final Office Action—U.S. Appl. No. 13/933,576.
Mar. 28, 2018—U.S. Non-Final Office Action—U.S. Appl. No. 13/587,635.
Mar. 30, 2018—U.S. Non-Final Office Action—U.S. Appl. No. 13/587,630.
Mar. 27, 2018—U.S. Non-Final Office Action—U.S. Appl. No. 15/855,057.
Apr. 3, 2018—U.S. Final Office Action—U.S. Appl. No. 14/190,976.
Jun. 20, 2018—U.S. Non-Final Office Action—U.S. Appl. No. 13/834,161.
Jun. 26, 2018—U.S. Final Office Action—U.S. Appl. No. 13/892,598.
Aug. 15, 2018—U.S. Non-Final Office Action—U.S. Appl. No. 13/834,170.
Sep. 5, 2018—U.S. Final Office Action—U.S. Appl. No. 14/063,517.
Sep. 4, 2018—U.S. Non-Final Office Action—U.S. Appl. No. 13/834,210.
Nov. 2, 2018—U.S. Non-Final Office Action—U.S. Appl. No. 14/269,387.
Oct. 9, 2018—U.S. Final Office Action—U.S. Appl. No. 13/834,161.
Nov. 9, 2018—U.S. Non-Final Office Action—U.S. Appl. No. 14/063,570.
Nov. 13, 2018—U.S. Final Office Action—U.S. Appl. No. 13/587,635.
Nov. 14, 2018—U.S. Non-Final Office Action—U.S. Appl. No. 13/892,598.
Sep. 17, 2018—U.S. Non-Final Office Action—U.S. Appl. No. 13/933,576.
Sep. 21, 2018—U.S. Final Office Action—U.S. Appl. No. 14/671,617.
Oct. 4, 2018—U.S. Final Office Action—U.S. Appl. No. 15/855,057.
Oct. 5, 2018—U.S. Final Office Action—U.S. Appl. No. 13/587,630.
"How Can We Stop Insurers Writing Estimates from Photos", Angelo DiTullio, Babcox Media, Inc., BodyShop Business 35.4: 48(2), Apr. 2016.
Aug. 28, 2019—U.S. Non-Final Office Action—U.S. Appl. No. 16/450,270.
"Stereoscopic Imaging", https://www.Techopedia.com/definition/91/stereoscopic-imaging, retrieved on Apr. 7, 2019, Year 2019.
Oct. 4, 2019—U.S. Final Office Action—U.S. Appl. No. 15/374,278.
Oct. 18, 2019—U.S. Notice of Allowance—U.S. Appl. No. 14/671,617.
Nov. 18, 2019—U.S. Notice of Allowance—U.S. Appl. No. 14/063,517.
Nov. 18, 2019—U.S. Notice of Allowance—U.S. Appl. No. 14/063,570.
Dec. 3, 2019 U.S. Non-Final Office Action—U.S. Appl. No. 14/269,387.
Dec. 5, 2019 U.S. Final Office Action—U.S. Appl. No. 15/855,057.
Jan. 29, 2020—U.S. Notice of Allowance—U.S. Appl. No. 14/458,826.
Mar. 26, 2020—U.S. Non-Final Office Action—U.S. Appl. No. 16/586,008.
Feb. 27, 2020—U.S. Final Office Action—U.S. Appl. No. 16/450,270.
May 20, 2020—U.S. Notice of Allowance—U.S. Appl. No. 13/834,161.
Jun. 11, 2020—Notice of Allowance—U.S. Appl. No. 16/570,421.
Jun. 12, 2020—U.S. Notice of Allowance—U.S. Appl. No. 15/855,057.
Jul. 16, 2020—U.S. Non-Final Office Action—U.S. Appl. No. 15/374,278.
Jul. 30, 2020—U.S. Final Office Action—U.S. Appl. No. 16/586,008.
Apr. 13, 2020—U.S. Final Office Action—U.S. Appl. No. 14/269,387.
Download our pocket agent app for iPhone today; retrieved from https://www.statefarm.com/about-us/innovation-research/mobile-apps/pocket-agent-for-iphone/; Copyright, State Farm Mutual Automobile Insurance Company, 2013.
Security First Mobile, downloaded from http://www.securityfirstflorida.com/security-first-mobile/, Copyright 2014 Security First Insurance Company.
Get the Nationwide Mobile App for Android and iPhone, downloaded from http://www.nationwide.com/mobile-support.jsp, 2014 Nationwide Mutual Insurance Company amd Affililated Companies.
Welcome to USAA! to get started, please enable cookies, downloaded from https://www.usaa.com/inet/pages/mobile_access_methods_mobileapps?akredirect=true, 2013 USAA.
Applying Image Analysis to Auto Insurance Triage: A Novel Application, downloaded from ieeexplore.ieee.org/xpl/login.jsp?tp=&arnumber=4412872&isnumber=4412796&url=http%3A%2F%2Fieeexplore.ieee.org%2Fstamp%2Fstamp.jsp%3Ftp% . . . , Copyright 2013 IEEE.
Farmers iClaim, downloaded from http://www.farmers.com/iclaim.html, 2014 Farmers Insurance Company.
Imaging Technology Saves the Day for Insurance Claim Processing; downloaded from www.snowbound.com/resources/articles/business-benefits-industry-information/imaging-technology-saves-day-insurance; 2013 Snowbound Software.

* cited by examiner

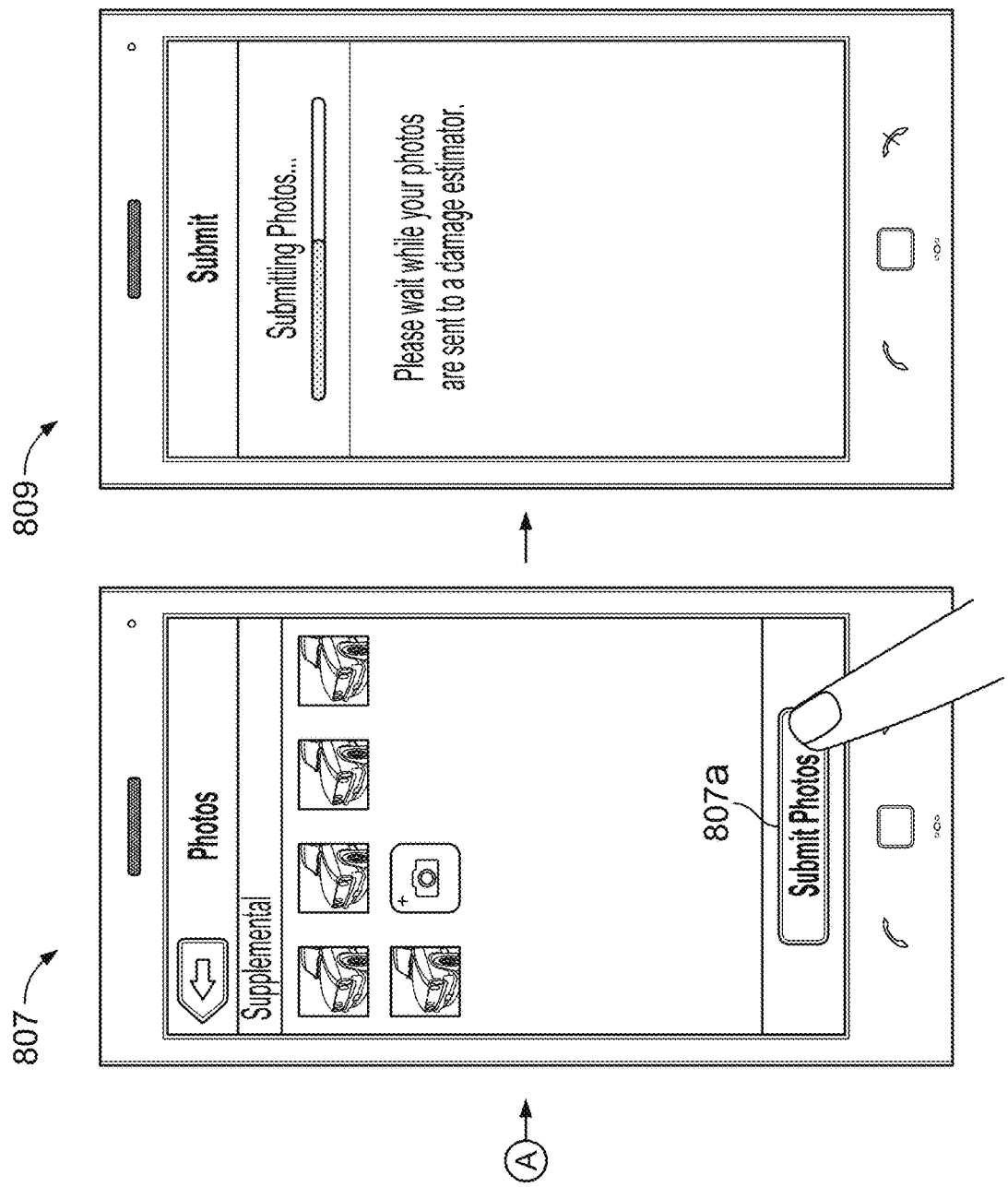

FEEDBACK LOOP IN MOBILE DAMAGE ASSESSMENT AND CLAIMS PROCESSING

CROSS-REFERENCE TO RELATED APPLICATIONS

This application is a continuation of U.S. patent application Ser. No. 13/587,635 entitled "Processing Insured Items Holistically with Mobile Damage Assessment and Claims Processing" and filed on Aug. 16, 2012, which is herein incorporated by reference in its entirety.

TECHNICAL FIELD

The present disclosure relates to systems and methods for analyzing damage to an insured item such as a vehicle and processing an insurance claim related to the analyzed damage.

BACKGROUND

Conventional insurance claims processing is a complex process that starts with a first notification of loss related to an insured item. Upon notification of loss, the claim may be routed to multiple claims adjusters that analyze different aspects of the damage associated with the insured item in order to determine whether compensation for the loss is appropriate.

In general, conventional claims adjustment can involve paperwork processing, telephone calls, and potentially face-to-face meetings between claimant and adjuster. In addition, a significant amount of time can elapse between a first notice of loss from the claimant and the final settlement of the claim.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the disclosure involve a streamlined and efficient process for claims management and disclose methods, computer-readable media, and apparatuses for automating the processing and settling of claims related to an insured item. A mobile device may transmit data (e.g., images, video, etc.) related to damage associated with an insured item to an enhanced claims processing server. The enhanced claims processing server may manage analysis of damage associated with the insured item and settlement of a claim related to the damage.

In another aspect of the disclosure, an enhanced claims processing server may analyze damage data received from a mobile device to generate a repair cost estimate for repairing the insured item.

Further aspects of the disclosure may be provided in a computer-readable medium having computer-executable instructions that, when executed, cause a computer, user terminal, or other apparatus to at least perform one or more of the processes described herein.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain the principles of the disclosure. In the drawings:

DETAILED DESCRIPTION

In accordance with various aspects of the disclosure, methods, computer-readable media, and apparatuses are disclosed through which insurance claims may be settled through an enhanced automated process. In certain aspects, when an enhanced claims processing server receives data regarding an insured item (e.g., a vehicle, etc.) from a computing device (e.g., a mobile device), the server processes the data and manages settlement of a claim associated with the insured item.

The automated process may utilize various hardware components (e.g., processors, communication servers, memory devices, sensors, etc.) and related computer algorithms to generate image data related to damage associated with an insured item, determine if the image data conforms to a predetermined set of criteria, analyze the image data to assess loss associated with the insured item, and determine if a payment is appropriate to the claimant as compensation for assessed loss.

Figure 1:
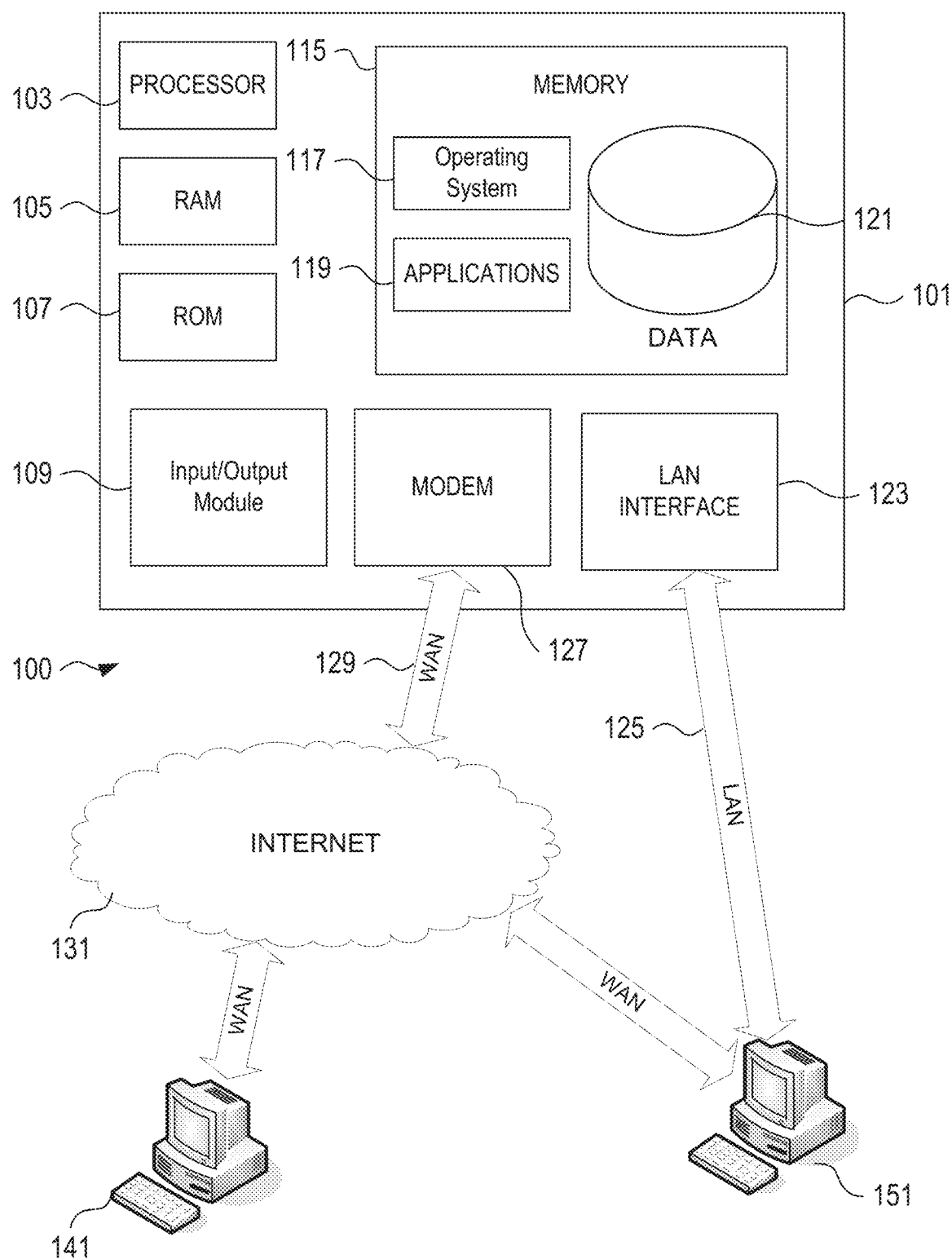
FIG. 1 shows an illustrative operating environment in which various aspects of the disclosure may be implemented.

FIG. 1 illustrates a block diagram of an enhanced claims processing server 101 (e.g., a computer server) in communication system 100 that may be used according to an illustrative embodiment of the disclosure. The server 101 may have a processor 103 for controlling overall operation of the enhanced claims processing server 101 and its associated components, including RAM 105, ROM 107, input/output module 109, and memory 115.

I/O 109 may include a microphone, keypad, touch screen, and/or stylus through which a user of enhanced claims processing server 101 may provide input, and may also include one or more of a speaker for providing audio output and a video display device for providing textual, audiovisual, and/or graphical output. Software may be stored within memory 115 to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to analyze image data depicting damage to an insured item (e.g., vehicle, etc.). Processor 103 may determine the general location of damage associated with the vehicle by analyzing images of the vehicle and comparing these images with reference images of a similar vehicle with no damage or with similar damage. In addition, processor 103 may assess the loss associated with the damaged vehicle and transmit terms for settling an insurance claim related to the loss to a user of a mobile device.

The server 101 may operate in a networked environment supporting connections to one or more remote computers, such as terminals 141 and 151. The terminals 141 and 151 may be personal computers or servers that include many or all of the elements described above relative to the server 101. Also, terminal 141 and/or 151 may be data stores for storing image data of insured items that have been analyzed by the enhanced claims processing server 101 in the past. In yet other embodiments, terminals 141 and 151 may represent mobile devices with built-in cameras for capturing image data associated with a damaged item.

The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced claims processing server 101 according to an illustrative embodiment of the disclosure may include computer executable instructions for invoking functionality related to calculating an appropriate payment for assessed damage associated with an insured item.

Enhanced claims processing server 101 and/or terminals 141 or 151 may also be mobile terminals including various other components, such as a battery, speaker, camera, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Figure 2:
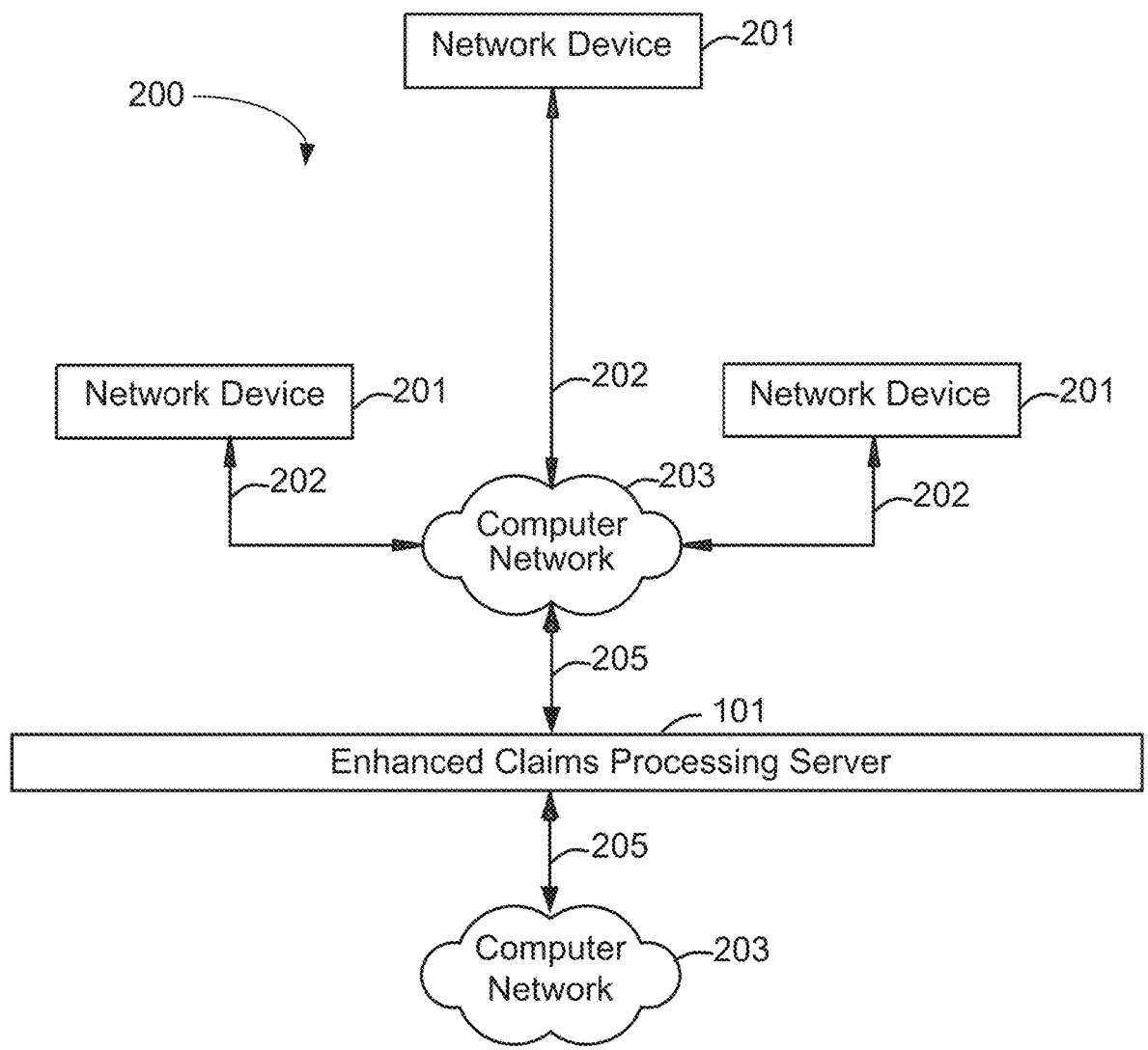
FIG. 2 shows a system of network devices and servers that may be used to implement the processes and functions of certain aspects of the present disclosure.

Referring to FIG. 2, a system 200 for implementing methods according to the present disclosure is shown. As illustrated, system 200 may include one or more network devices 201. Devices 201 may be local or remote, and are connected by one or more communications links 202 to computer network 203 that is linked via communications links 205 to enhanced claims processing server 101. In certain embodiments, network devices 201 may run different algorithms used by server 101 for analyzing image data showing damage associated with an insured item, or, in other embodiments, network devices 201 may be data stores for storing reference image data of insured items. In yet other embodiments, network devices 201 may represent mobile user devices configured to capture image data (e.g., via a camera, etc.) associated with a damaged insured item and to transmit the image data to server 101. In system 200, enhanced claims processing server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and server 101, such as network links, dial-up links, wireless links, hard-wired links, etc.

The steps that follow in the Figures may be implemented by one or more of the components in FIGS. 1 and 2 and/or other components, including other computing devices.

In accordance with aspects of the disclosure, a user (e.g., a claimant) of a mobile device (e.g., mobile phone, personal digital assistant (PDA), etc.) may take a variety of photos associated with damage to an insured vehicle. The photos may include wide shots of the damaged vehicle, pictures of an identification number associated with the damaged vehicle (e.g., a vehicle identification number (VIN), etc.), and/or multiple angles/close-up shots of the damage associated with the insured vehicle.

Once the user is satisfied that the appropriate photos have been taken, the user may transmit the photos to an enhanced claims processing server 101. The enhanced claims processing server 101 may be configured to receive and analyze the photos to determine if they meet a predefined set of criteria (e.g., not too blurry, correct angles, etc.) for completeness, accuracy, etc. If the photos do not meet the minimum criteria, server 101 may transmit a message (e.g., via a feedback loop), informing the mobile device that alternative and/or additional photos must be taken. This process of assuring that the photos are compliant for further analysis may be repeated until the user of device 201 has complied with all of the rules set forth by enhanced claims processing server 101. Server 101 may then analyze the photos to generate an output, including a cost estimate to repair the damage associated with the insured vehicle and/or to replace a damaged part of the insured vehicle. In some aspects, to generate this output, server 101 may analyze the photos and determine the location of damage (e.g., exterior parts, etc.), extent of damage, and/or the cost of parts/labor to fix the damage.

In some instances, depending on the amount of damage to the insured vehicle, the cost estimate may represent the cost of replacing the insured vehicle itself. Along with the cost estimate for repair/replacement of the insured vehicle, server 101 may also output various claims documents, including disclosures, brochures, guarantees, etc. If appropriate, server 101 may transmit a payment to the user and/or to an account associated with the user, for the cost of repairing the damage or replacing a part. In addition, server 101 may inform the user approximately how long it will take to repair/replace the insured vehicle.

In some aspects, damage inspection and appraisal in the automated claims processing scheme discussed herein may be completed in thirty minutes or less.

Although embodiments of the disclosure discussed herein relate to an insured vehicle analyzed by enhanced claims processing server 101, one of ordinary skill in the art would recognize that other types of insured items, including homes, may be employed with a similar scheme.

In certain aspects, the use of server 101 may aid in cutting down time between a first notice of loss and settlement of the claim (e.g., real-time settlement of a claim) associated with the loss (e.g., via a payment and/or information regarding repair/replacement of an insured item). In addition, because the methods discussed herein are automated and involve minimal and/or no involvement from claims adjusters, less time and money may be spent to transport these adjusters to inspection locations. The automated nature of this process may also create the opportunity for remote human inspections of damage associated with insured items.

Also, the technologies used in the claims adjustment processes implemented by server 101 may aid in attracting technology savvy consumers to an entity (e.g., an insurance company) managing server 101.

Figure 3:
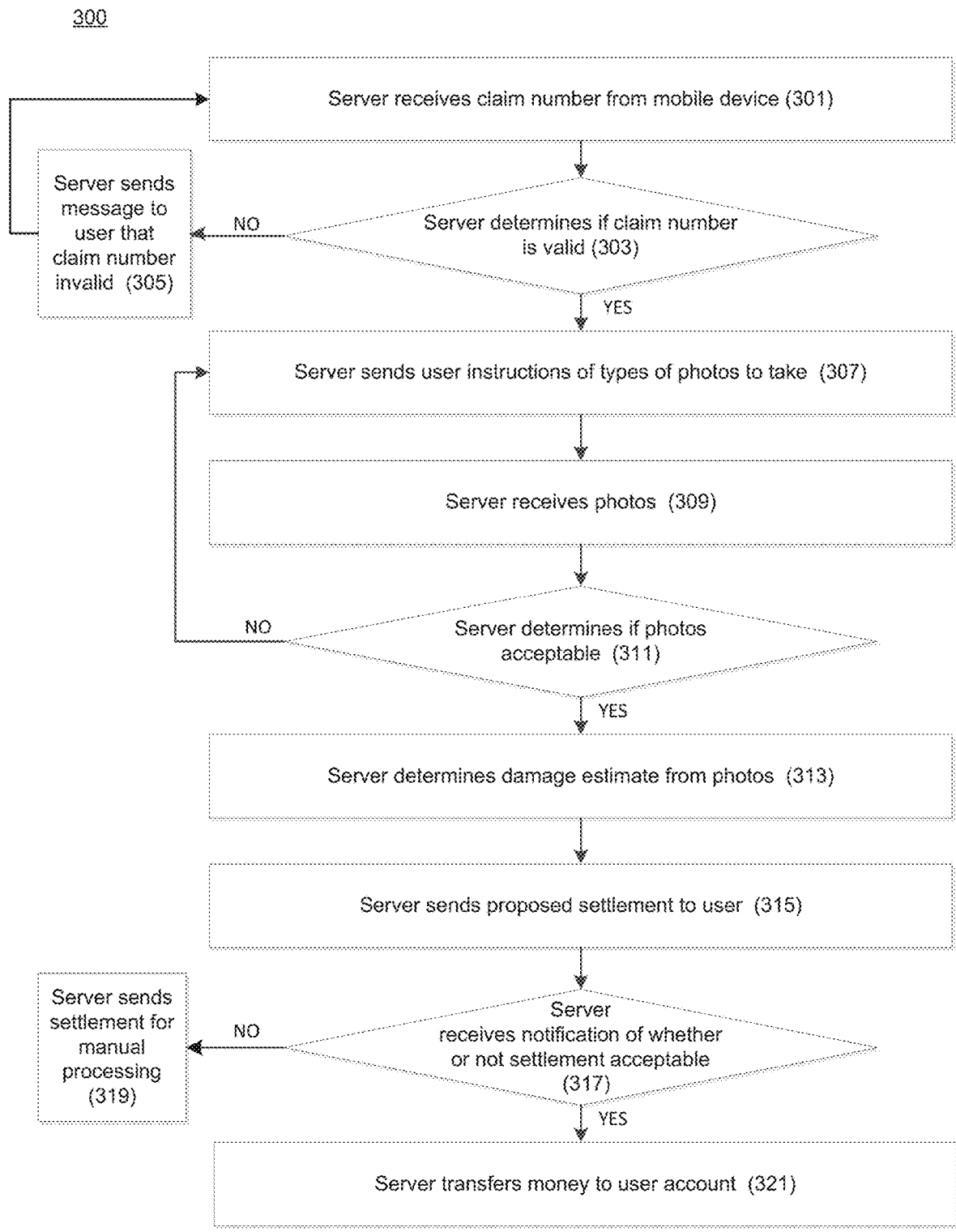
FIG. 3 shows a flow chart for an automated damage assessment process in accordance with certain aspects of the present disclosure.

FIG. 3 shows an automated damage assessment process 300 in accordance with at least one aspect of the present disclosure. In certain aspects, an application related to damage assessment and claims processing may be downloaded onto a mobile device (e.g., iPhone™, Android™, etc.) associated with a user (e.g., a customer of an insurance company) to facilitate one or more steps of the process in FIG. 3.

The process of FIG. 3 may start out at step 301 where a user (e.g., a customer) associated with an entity managing enhanced claims processing server 101 (e.g., insurance company) may enter a claim number (e.g., a number related to damage associated with an insured vehicle, etc.) into a damage assessment and claims processing application running on a mobile device (e.g., network device 201). To generate a claim number, a claimant may contact an entity managing enhanced claims processing server 101 (e.g., an insurance company, etc.) with a first notice of loss (FNOL). The claimant may contact the insurance company in any number of ways, including via phone, by email, via a company website, etc. As part of the FNOL, the claimant may provide basic identifying and/or validating information (e.g., name, age, claim number, etc.) and vehicle information, including the make, model, and year of manufacture. The claimant may also provide the general areas of damage to the vehicle and any other relevant details (e.g., condition of glass, under carriage, engine, wheels, airbags, etc. associated with the vehicle). In one embodiment, this information may be provided from a remote location (e.g., location of an accident, claimant's home, etc.) using an application loaded onto a smart phone (e.g., iPhone™, Android™, etc.).

The mobile device may then transmit the entered claim number and related information to enhanced claims processing server 101. The process may then move to step 303 where server 101 may determine if the claim number received in step 301 is valid. If server 101 determines that the claim number is not valid, then server 101 may transmit a message to the mobile device, stating that the claim number is invalid in step 305. The user may then enter another claim number (step 301).

If server 101 determines that the claim number is valid, the process may move to step 307 where server 101 may send the user instructions of the types of image data (e.g., photos, video, etc.) that should be captured of damage associated with the insured vehicle. It should also be noted that in some embodiments server 101 may not receive a claim number and may proceed in providing user instructions on the types of image data that should be captured without receiving a claim number. The user may receive instructions on various types of photos/video, including photos/video of the entire vehicle, VIN door tag, and/or the damaged areas. In some aspects, the user may capture image data related to at least two different angles of the damage for each panel (e.g., hood, fender, door, bumper, etc.) based on an initial claim description.

When the user of the mobile device receives these instructions, the user may use a camera associated with the mobile device to take the photos and transmit these photos to the server 101. The user may be allowed to preview each photo before selecting the image. Once a photo has been selected, the image may be shown on a display associated with the mobile device under a photo type (e.g., a photo of the entire vehicle, VIN door tag, and/or damaged area). If the user is not satisfied with any photo, the user may delete the photo by selecting it. In some aspects, the user may annotate the photos (e.g., by drawing a line from one end of the dent to the other, etc.) prior to transmitting them to server 101. In yet other embodiments, server 101 may itself annotate any received photos/video.

In some embodiments, any approved photo may not be sent to server 101 until all of the images have been captured. In some aspects, server 101 may support a website interface through which photos may be uploaded by a user of a mobile device. Also, the use of multiple photos (e.g., via stereoscopic techniques), video (e.g., by walking around the vehicle to generate a complete view), and/or three-dimensional photos/video may assist in determining the depth of damage to a vehicle. In some aspects, determining the depth of damage may help in classifying the damage (e.g., a turbulent dent versus a dish dent). In addition, the degree of damage by area and depth may be automatically estimated through tools similar to ultrasound tools. Knowing the depth of damage may also assist in automatically determining the cost of repair or replacement. In addition, as the user is taking video/photos of damage associated with the insured vehicle, a claims adjuster associated with an entity managing server 101 (e.g., an insurance company) may interface with the user in real-time (e.g., via phone, email, etc.) as the photos are being sent to the adjuster and/or as the video is being streamed to the adjuster and describe to the user the photos/video that still need to be taken and/or where to place a camera as the photos/video are captured.

After server 101 receives image data transmitted from a mobile device in step 309, server 101 (or an individual/group associated with the entity managing server 101) may determine if the photos are acceptable in step 311. For instance, server 101 may determine that the photos are too blurry and/or that the photos do not capture the correct angles to clearly show damage associated with the insured vehicle. As an example, server 101 may employ a bar code scanning mechanism and/or an optical character recognition (OCR) system for detecting the VIN from a submitted photo. In other aspects, the mobile device itself may use a bar code scanning mechanism and/or an OCR system for determining the VIN number. In this example, if the VIN cannot be detected from the photo and/or using these techniques, then the submitted photo may be deemed to be unacceptable. If server 101 determines that that the photos are not acceptable, the process may move back to step 307 where the server 101 may send the user instructions on what types of photos to take and/or what changes need to be made to the previously submitted photos. In yet other embodiments, a dispatcher associated with an entity managing server 101 (e.g., an insurance company) may determine if submitted photos are acceptable. In other embodiments, the mobile device may itself determine if any given photo is blurry and/or inaccurate and prompt the user to retake the photo. In this aspect, the application for damage assessment and claims processing running on the mobile device may have computer-executable instructions stored within a memory of the mobile device for automatically detecting and/or rejecting a photo/video captured within a given category.

If server 101 determines that the photos are acceptable, server 101 may attach the photos to the user's claim in a database associated with server 101. Server 101 may also determine a damage estimate (e.g., an estimate for repairing and/or replacing any damaged parts) after analyzing the photos in step 313 based on predefined rules. The damage estimate may be generated by comparing the photos submitted by the mobile device with photos of similarly damaged vehicles or with photos of non-damaged vehicles of similar make/model. To perform this comparison, server 101 may access a database (e.g., network device 201) of photos of vehicles with various types of damage and/or vehicles with no damage. To initially populate the database with photos for later use, each user may be required to upload various photos of a vehicle upon purchase of the vehicle. Also, as server 101 analyzes recently submitted photos, previously uploaded photos of a given vehicle may be used to determine any pre-existing damage on the vehicle. Once database 201 includes photos/video from many cases of vehicle damage, server 101 may determine a damage estimate for a new case based on the prior cases.

Server 101 may not need to build a new damage estimate piece-by-piece for a given damaged vehicle. In this regard, server 101 (or an individual/group associated with the entity managing server 101) may generate a new damage estimate based on a holistic view of a damaged vehicle. Over time, server 101 may build a database (e.g., network device 201) of specific damage templates (e.g., damages to more than one part of a vehicle that are commonly associated with one another) and estimated/actual costs for repairing damages associated with these templates. Once this database has been built, damage estimates associated with subsequently analyzed vehicles may be generated from a holistic view of the vehicles by accessing information within the historical database.

For instance, if a first type of damage to the front bumper of a vehicle is commonly associated with a second type of damage to the headlights of the same vehicle and this damage template is associated with a predetermined repair cost in the database, server 101 may use this repair cost to generate a new estimate for subsequent vehicles that exhibit damage similar to this damage template.

In one example, the damage estimates retrieved from the historical database may be adjusted based on differences associated with a current case. For instance, the damage estimate may be adjusted based on the average inflation rate (e.g., for parts, labor, etc.) between the date at which the damage estimate within the historical database was generated and the current date. In other embodiments, the damage estimate may be adjusted for small differences such as the make, model, and year of manufacture when the vehicle in the historical database and the currently analyzed vehicle are compared. Similarly, the damage estimate may be adjusted based on differences in the precise damage associated with the vehicle in the historical database and the damage associated with the vehicle currently being analyzed. In yet other examples, the damage estimate may be adjusted based on the terms of an insurance policy that covers damage to the insured vehicle currently being analyzed. One of ordinary skill in the art would understand that any number of factors may be considered when adjusting the damage estimate retrieved for vehicles stored in the historical database to more accurately reflect a damage estimate for a currently analyzed vehicle.

In other aspects, when a vehicle exhibits more than one type of damage, server 101 may access the historical database multiple times (one for each type of damage) and then add one or more interaction terms to the sum of the cost estimates for each type of damage. For instance, extending the example above of damage to a front bumper and to the headlights of a vehicle, server 101 may generate a first damage estimate for repairing the front bumper and a second damage estimate for repairing the headlights. Server 101 may then add these two damage estimates to generate a total damage estimate.

In this embodiment, server 101 may also calculate an interaction term (which may be a positive or a negative value) that represents either an increased (e.g., because the damages taken collectively introduce more complexity and are thus more expensive to repair than if handled individually) or decreased (e.g., because the damages taken collectively have overlapping repair procedures and are thus less expensive to repair than if handled individually) cost of repairing the vehicle when both of these types of damages occur together. The effective total damage estimate may then be the sum of the total damage estimate and the interaction term.

One of ordinary skill in the art would understand that a given damage template may be built based on any number of specific damage types/locations. In addition, server 101 may generate any number of interaction terms for a given analysis. For instance, if a damage estimate is based on damage to three parts of a vehicle, server 101 may generate interaction terms that relate to increased/decreased cost associated with repair to the following part groups: the first two parts, the first and third parts, the second and third parts, and all three parts at once. In other embodiments, server 101 may generate an interaction term for only some of the damaged parts.

In certain aspects, server 101 may also query the claimant with regards to the type of third party service provider (e.g., repair shop, etc.) they would prefer after damage analysis and claims processing is complete.

In other aspects, exterior damage associated with the vehicle may be used to predict (e.g., via predictive modeling using the database of past assessed exterior/interior damage for other similar cases, etc.) the likelihood of interior (e.g., mechanical, cabin, etc.) damage to the vehicle and/or potential difficulties in repairing the vehicle.

Once the image data has been analyzed, server 101 may include computer-executable instructions to recognize the extent of damage to various parts of the vehicle (e.g., chassis, etc.), including various types of dents and edge damage, and to identify various parts of the vehicle.

In some aspects, the detection of damage to the vehicle may be based on object recognition algorithms that compare images (e.g., comparing x, y, and z coordinates of each point on the images) of the vehicle in question to reference images of similar vehicles (e.g., same model, make, year of manufacture, etc.) with no damage. More specifically, server 101 may access a database of images storing the reference images of vehicles of various models and makes. By using object recognition/edge detection algorithms (e.g., involving blur filters, gray-scaling, custom algorithms, etc.), server 101 may determine where damage is located as well as the potential size/area of the damage. Server 101 may also access internal/external databases storing images, damage depth map information (e.g., from previously assessed analyses, etc.), and/or processed claims reports from damaged vehicles that server 101 has assessed previously. In particular, server 101 may access images/depth map information from previously assessed damaged vehicles for use as a guidepost in assessing the damage of a new vehicle. If no reference information (e.g., data, images) exists, axis symmetry information may also be used to identify possible irregularities and/or damage.

In some aspects, the algorithm employed by server 101 may use a comparison of an image of a damaged vehicle with an image of an undamaged version of the same vehicle to "subtract out" and isolate the damaged area of a vehicle. If an exact replica of an undamaged vehicle corresponding to a damaged vehicle under study is not available for this comparison, server 101 may further use various additional image processing algorithms, including blurring filters, etc. to detect a damaged portion of a vehicle.

In additional aspects, server 101 may grayscale all image data to make processing faster. Further, edge filters may be applied to both the image data from the damaged vehicle and its corresponding reference image data so that the edges of a damaged area may be "subtracted out" and identified in the image data of the damaged vehicle. Once the damaged area has been identified in the image data, server 101 may further process the damaged area to sharpen the area, to make the edges more prominent, and to fill any missing links found in the edges. Afterwards, server 101 may color, texture, and/or otherwise "fill in" the damaged area surrounded by the edges and extract the damaged area from the surrounding image data. Once the damaged area has been isolated, server 101 may calculate the precise area of the damage.

Similarly, server 101 may determine the depth of a damaged area (e.g., via stereoscopic methods, etc.) and may analyze raw depth data to further investigate points of interest (e.g., a point that has a much larger depth than surrounding points, etc.). Using this analysis, the damaged area may be further characterized (e.g., a dented area may be detected and if, for example, the general slope of the dent is high, the dent may be characterized as deep and rounded whereas if the slope is low, the dent may be characterized as shallow.)

In addition, if the server 101 retrieves image data or claims reports associated with a similar or the same previously analyzed vehicle that has similar or the same types of damage (e.g., as a result of a similar accident to a similar vehicle or part, etc.) as a vehicle currently being analyzed, server 101 may use a damage analysis or cost estimate of identifying/repairing the damage or replacing a damaged part of the previously analyzed vehicle to generate a damage analysis/cost estimate for the currently analyzed vehicle. In other words, server 101 may perform one or more database queries to match characteristics of the current analysis with previous analyses. For instance, the queries may seek to match the size, depth, and location of a dent on a current vehicle with a similar dent on a vehicle with a similar chassis configuration, make, model, and year of manufacture. For instance, consider a case where the vehicle in question is a new model that has not been analyzed before by server 101. In this scenario, server 101 may attempt to match the vehicle currently being analyzed with its closest match, which in this case may be a similar model from the previous year with the same chassis configuration (e.g., a twin chassis configuration).

In matching a vehicle currently being analyzed with one that has been previously analyzed, server 101 may assign a confidence factor to the match. Server 101 may assign the highest confidence factor (e.g., a confidence factor of 100%) to a comparison between the exact same types of vehicles (e.g., cars of the same make, model, year of manufacture, etc.) having the exact same type of damage (e.g., a predetermined type of dent, etc.). For instance, a comparison between vehicles with two completely different types of damage would have a confidence factor of 0%. As the similarities between the currently analyzed vehicle and previously analyzed vehicles are reduced, server 101 may assign a lower confidence factor to the comparison. For instance, output drawn from comparisons between vehicles of the same make and model but with different years of manufacture may be associated with a slightly lower confidence factor than 100%. In some aspects, confidence factors may decrease further when vehicles of different models and years of manufacture (e.g., vehicles with different chassis configurations, trim line configurations, etc.) but the same make are compared. In one embodiment, server 101 may assign a threshold confidence factor (e.g., 70%, etc.) below which output generated by a comparison performed by server 101 may not be considered reliable. If the confidence factor associated with a comparison between two vehicles falls below this threshold and there is no reliable comparison within the database, server 101 may then use physical details of the damage (e.g., size, location, area, etc.) to provide output such as a cost estimate for damage repair/replacement and/or the amount of time required for repair/replacement.

Server 101 may also use stored data to determine appropriate vendors for repairing/replacing the vehicle and the amount of time for repair/replacement. The wait time for repair/replacement may depend on various factors, including the size (e.g., area, depth, etc.), classification (e.g., turbulent dent, etc.), and location of the damage.

In addition, server 101 may determine if parts nearby to damaged parts may also need to be blended into the damaged area. In other words, if a part of the vehicle needs to be refinished (e.g., repainted) either because it is being replaced or repaired, parts within a predetermined distance of the repaired/replaced part may need to be blended (e.g., color-matched) to the repaired/replaced part.

In some aspects, server 101 may acquire the knowledge of all previous claims processed by server 101, as well as the knowledge of human adjusters, to accurately process future claims. In this way, server 101 may use machine learning to evolve its cost and/or repair estimation procedure based on past experience.

To estimate the cost and repair/replacement time associated with the damage to the vehicle and to determine whether to recommend that the vehicle be replaced or repaired, server 101 may also consider the extent/severity of the damage (area, depth, location, classification, etc.). For instance, damage to a character line (e.g., edge of a door associated with the vehicle) would be more difficult (e.g., more expensive and/or more time-consuming, etc.) to repair than damage to a more central location on the vehicle. Server 101 may also consider the actual cash value and the salvage value of the vehicle and any relevant local, state, and national laws in this analysis. In some aspects, server 101 may generate a rough cost estimate of repairing the damage just based on the extent of the damage; then server 101 may refine this estimate by analyzing previous cost estimates provided by server 101 and/or actual repair data received from third party service providers (e.g., repair shops, etc.) that have repaired similar vehicles with similar damage. In additional aspects, server 101 may generate a basic cost estimate by taking into account factors such as the number of hours predicted for the repair, the labor rate, and the current market conditions. In this aspect, server 101 may compare this basic cost estimate with the cost of merely replacing the vehicle (e.g., a total loss) or the damaged part within the vehicle and based on the comparison, server 101 may recommend the cheaper option. These estimates may also be transmitted to existing platforms (e.g., Audatex®, Mitchell®, etc.) for comparison purposes.

If the analyzed damage to the vehicle is different from the damage indicated by the claimant during the FNOL, server 101 may query the claimant as to the discrepancy. For instance, if the claimant initially provided information relating to damage on the left side of the vehicle but server 101 discovers that the primary damage occurred on the right side, server 101 may question the claimant as to when the damage occurred (e.g., was the damage due to a previous incident or preexisting condition?, is the claimant being truthful?, etc.). Server 101 may also ask the claimant to sign a statement as to the truth of the information provided. The claimant may have the option of answering the questions as they come up or the questions may be queued until the server 101 has finished processing the image analysis of the vehicle. If discrepancies between the claimant's answers and the analyzed damage to the vehicle continue to exist, server 101 may request the involvement of a human claims adjuster.

In other embodiments, a technician associated with an entity managing server 101 (e.g., an insurance company) may analyze the photos to determine a damage estimate. Also, in certain aspects, the process discussed herein may allow a user to upload photos/video that fall into alternative and/or additional categories (e.g., photos for each vehicle part, etc.).

As part of the image/video damage analysis, server 101 may ask the user to compare damage associated with the insured vehicle to damage depicted in a series of photos/video sent by server 101. In other embodiments, server 101 may request that the user classify the type of damage associated with the insured vehicle. For instance, server 101 may ask the user questions such as, "Does the damage to your vehicle look more like the damage shown in photo A or photo B?" Server 101 may ask any number of questions until server 101 has reached a clear understanding of all the damage to the insured vehicle and a damage estimate can be calculated. In some ways, this process may allow the user to estimate the damage to the insured vehicle.

As an example, consider a scenario where a driver's side door is dented and the driver's side window is cracked in a four-door sedan. Assume that the damage is centrally located on the driver's side window and door. Once server 101 receives a valid claim number related to this damaged sedan, server 101 may transmit, to a user device, one or more images depicting various types of damage to the driver's side window and door of four-door sedans that have been previously analyzed and/or stored in memory. The first image or images transmitted to the user device may be based on previously submitted information regarding an accident that caused the damage or any other type of input provided by a claimant and/or related parties. Thus, the first image or images transmitted to the user device may not depict damage that precisely conforms to the damage of the sedan currently being analyzed. For instance, if two images are initially transmitted to the user device, one of the images may depict damage to the corner of the driver's side window and door and the other image may depict damage that is located closer to the center. In this scenario, a user of the user device (e.g., a mobile phone), upon analyzing the two images, may select the image that depicts the centrally-located damage. The mobile device may then transmit the selection to server 101, and server 101 may use this information to generate a damage estimate.

Alternatively, suppose that both images initially transmitted from server 101 depict damage to the corner of the driver's side door and window in a four-door sedan. In this scenario, if both images are equally unrepresentative of the damage to the sedan in question, the user may transmit a message to server 101, stating how the reference images are equally unrepresentative. In response to this message, server 101 may transmit another image or images responsive to the information provided by the user in the message. Once again, the user may select one or more images that most closely depict damage to the sedan in question. Suppose that, on the second pass, server 101 again transmits two images and that, in this instance, both images depict damage to four-door sedans with centrally-located damage to the driver's side door and window. However, suppose that one of the images does not depict damage that is as severe as that exhibited by the sedan in question. In this scenario, the user may choose the image that depicts damage with the severity level consistent with the damage to the sedan in question.

By iterating through multiple rounds of image analysis and data exchange between server 101 and a user device, server 101 may, with each successive round, determine more precisely the damage associated with the sedan in question. When server 101 determines that the damage to the sedan has been fully characterized, server 101 may use the various responses provided by the user device to calculate a damage estimate for the damage to the sedan and transmit a settlement based on the calculated estimate.

In other embodiments, server 101 may transmit an insurance claim to a claims adjuster for manual processing of the claim if server 101 cannot calculate an accurate damage estimate after a predetermined number of question/answer rounds.

In additional embodiments, the user may transmit audio (e.g., by speaking into the mobile device, etc.) and/or an audio file that includes a description of what happened to cause the damage to the vehicle (e.g., the specifics of an accident, etc.). This audio/audio file may be translated into text and incorporated into the photos/video of damage and/or analyzed to determine if the damage matches any narrative description provided by the user. Also, the user may transmit a text file describing damage and/or an accident that caused the damage. In yet other embodiments, the user may capture and transmit the sound of the vehicle being started and/or the sound of the vehicle running to server 101 (e.g., to determine if a muffler associated with the damaged vehicle is broken, etc.).

Based on the analysis and the damage estimate, server 101 may transmit a proposed settlement (e.g., cash compensation, etc.) for the assessed loss to the user of the mobile device in step 315. After the user receives the proposed settlement, the user may notify server 101 whether or not the proposed settlement is acceptable in step 317.

If the settlement terms are not acceptable, then the process may move to step 319 where server 101 may transmit the settlement to a claims adjuster for manual processing. If the settlement terms are acceptable, the process may move to step 321 where server 101 may transfer any funds related to the assessed loss directly to a bank account associated with the user.

In some aspects, users may provide feedback designed to evaluate their experience through process 300. This feedback may be used to improve process 300 for future users and may involve the use of surveys, questionnaires, email, etc.

In other aspects, server 101 may determine and/or transmit supplemental adjustments to an initial damage/repair estimate. For instance, server 101 may determine that there is a 95% chance that repair option A must be performed, a 50% chance that additional repair option B must also be performed, and a 10% chance that additional repair option C must also be performed. When a repair shop examines the damage to a damaged vehicle and notices that there is less/additional damage, server 101 may use this information to revise an initial damage estimate with a supplemental adjustment to the initial estimate. Also, in cases where server 101 predicts that there may be many supplemental adjustments (e.g., above a predetermined threshold number of supplemental adjustments) to the initial estimate of damage, a claims adjuster may manually evaluate the damage and determine the likelihood of each of the supplemental adjustments.

In addition, server 101 may provide the user with a list of repair facilities for repairing the vehicle. Once the vehicle enters the repair process, messages may be pushed to the mobile device of the user to identify where the vehicle is located is in the repair process (e.g., which step of the repair process is the current step, etc.). These messages may identify who is working on the vehicle and/or may include photos/video of the vehicle as it is being repaired. The messages may also identify when the repair process may be completed.

In some aspects, some types of claims may be excluded from the automated process illustrated in FIG. 3. These claims may include comprehensive claims, claims with injuries to any involved parties, claims involving non-drivable vehicles or air bag deployments, claims with loss descriptions that include undercarriage/mechanical damage, claims involving motorcycle and/or recreational vehicle (RV) losses, and claims involving users that already have an estimate for damage associated with an insured vehicle.

Figure 4:
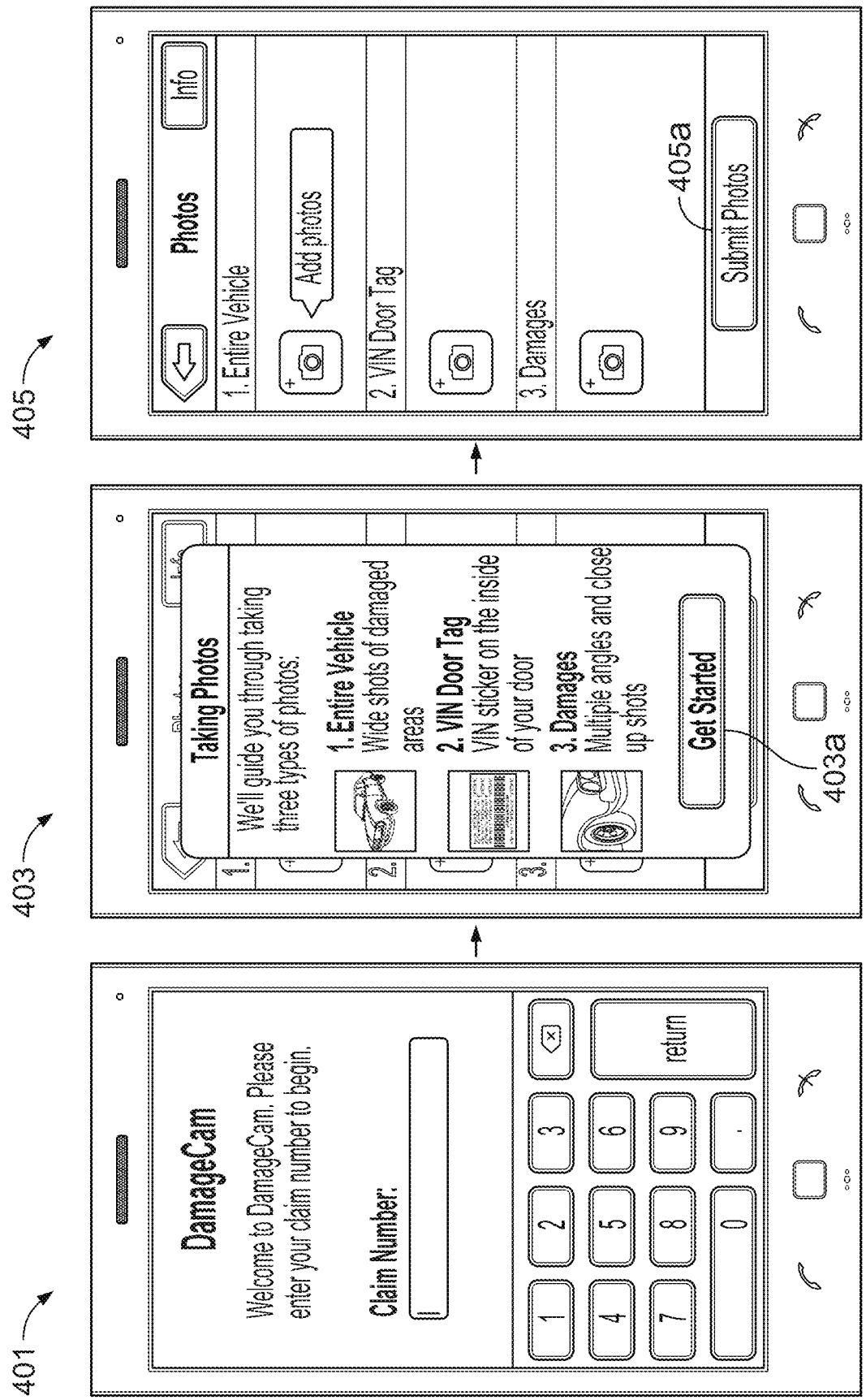
FIG. 4 shows a series of initial display screens displayed when a user starts a damage assessment and claims processing application stored on a mobile device in accordance with certain aspects of the present disclosure.

FIGS. 4-8 show various display screens displayed to a user of a mobile device in accordance with at least one aspect of the present disclosure. FIG. 4 shows a series of initial display screens displayed when a user starts a damage assessment and claims processing application stored on a mobile device (e.g., network device 201) in accordance with at least one aspect of the present disclosure. Screen 401 may be the initial screen that the user views upon starting the application. Screen 401 may allow the user to enter a claim number to begin a damage assessment and claims processing method. In certain aspects, the claim number may be used to compare a damage estimate generated by analysis of photos submitted by the user to a damage estimate generated manually by a claims adjuster using more conventional claims adjustment techniques. Once a user enters a valid claim number, the mobile device may display screen 403, where the user is presented with photo instructions that explain to the user the types of photos that should be taken. Screen 403 may include instructions on taking photos of the entire insured vehicle, VIN door tag, and any damaged areas of the insured vehicle. When a user presses the "Get Started" button 403a on screen 403, the mobile device may display screen 405, which allows a user to select and start taking any of the types of photos listed in screen 403 (e.g., photos of the entire vehicle, VIN door tag, and/or damaged areas). The "Submit Photos" button 405a on screen 405 may be inactive until at least one photo of each type is taken by the user.

Figure 5A:
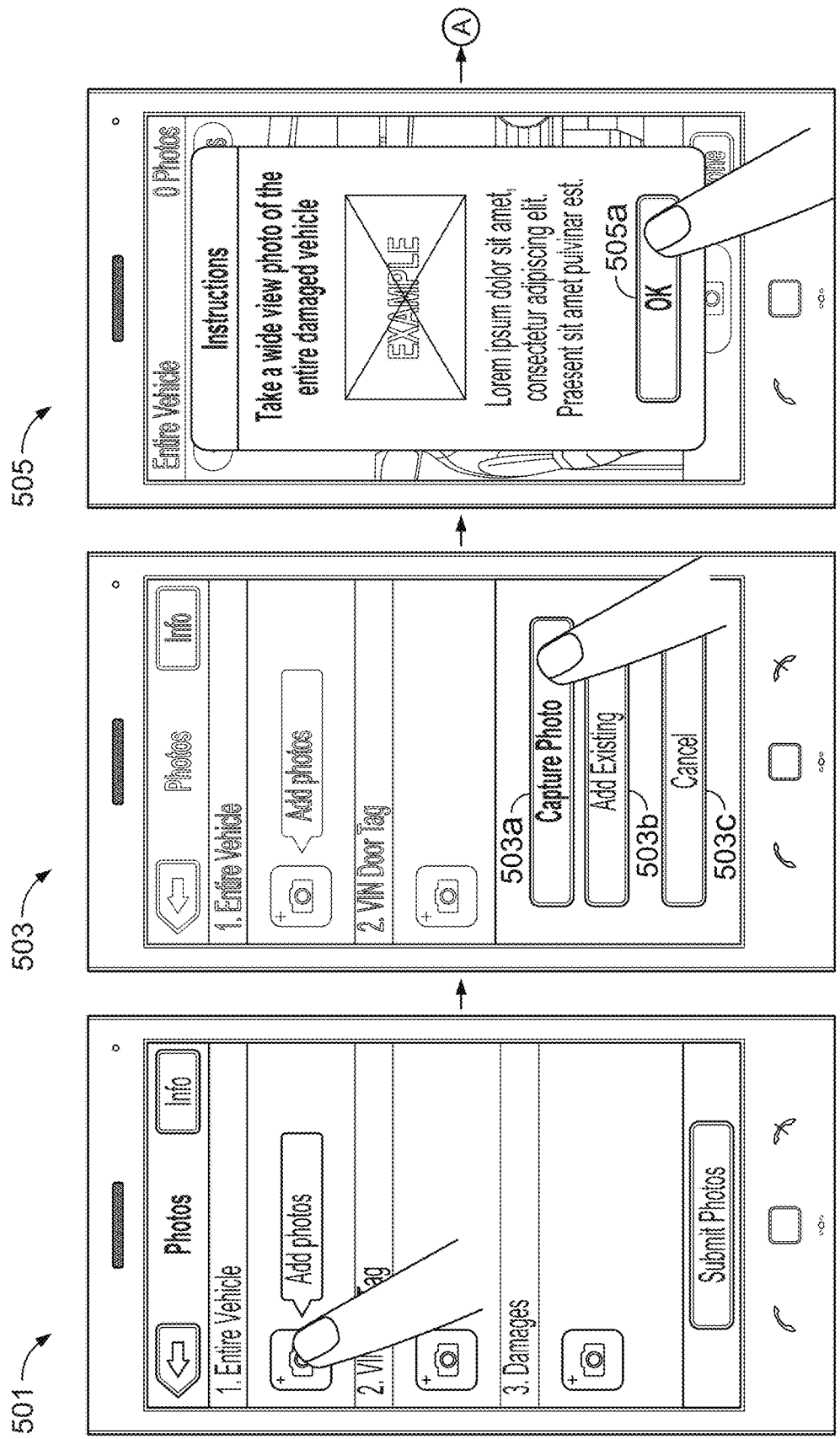
FIG. 5a shows a first series of display screens displayed on a mobile device as a user takes photos of a damaged vehicle in accordance with certain aspects of the present disclosure.
Figure 5A:
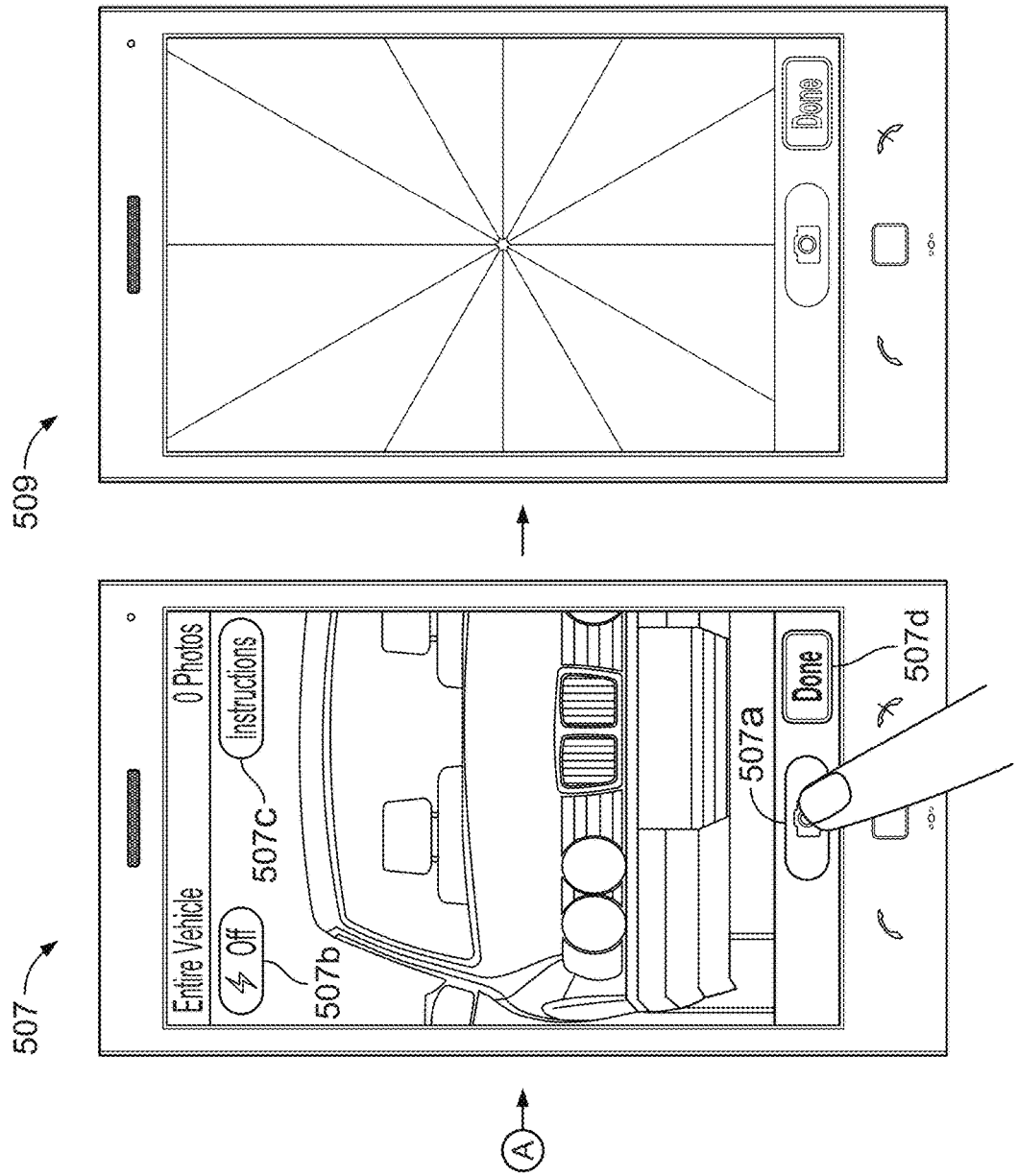

FIG. 5a shows a first series of display screens displayed on a mobile device as a user takes photos of a damaged vehicle in accordance with at least one aspect of the present disclosure. In display screen 501, the user may select to take a photo of the entire vehicle, the VIN door tag, and/or the specific damaged area(s). In the example of FIG. 5a, a user selects to take a photo of the entire vehicle. When a user selects one of the photo categories in screen 501, screen 503 may allow the user to select the "Capture Photo" button 503a to start the camera functionality within the mobile device, the "Adding Existing" button 503b to choose a photo from the photo roll, and/or the "Cancel" button 503c to cancel out of the previous command.

Assuming that the user selects the "Capture Photo" button 503a in screen 503, the mobile device may display screen 505 where instructions related to the current photo type (e.g., a wide view of the entire vehicle) may be overlaid on top of the camera. The user may select the "OK" button 505a on screen 505 to close the overlay and cause display of the camera screen 507. Camera screen 507 may include a camera shutter button 507a (e.g., for taking a photo) and flash button 507b (e.g., for turning the camera flash on/off). The "Instructions" button 507c on screen 507 may open the instructions overlay from screen 505, and the "Done" button 507d on screen 507 may save all photos that have been taken to a memory of the mobile device and may return the user to the main photos screen 501. When the user selects the shutter button 507a in screen 507, the mobile device may display screen 509 to indicate that a photo is being taken. In some aspects, all buttons on screen 509 may be disabled after the user selects the shutter button 507a.

Figure 5B:
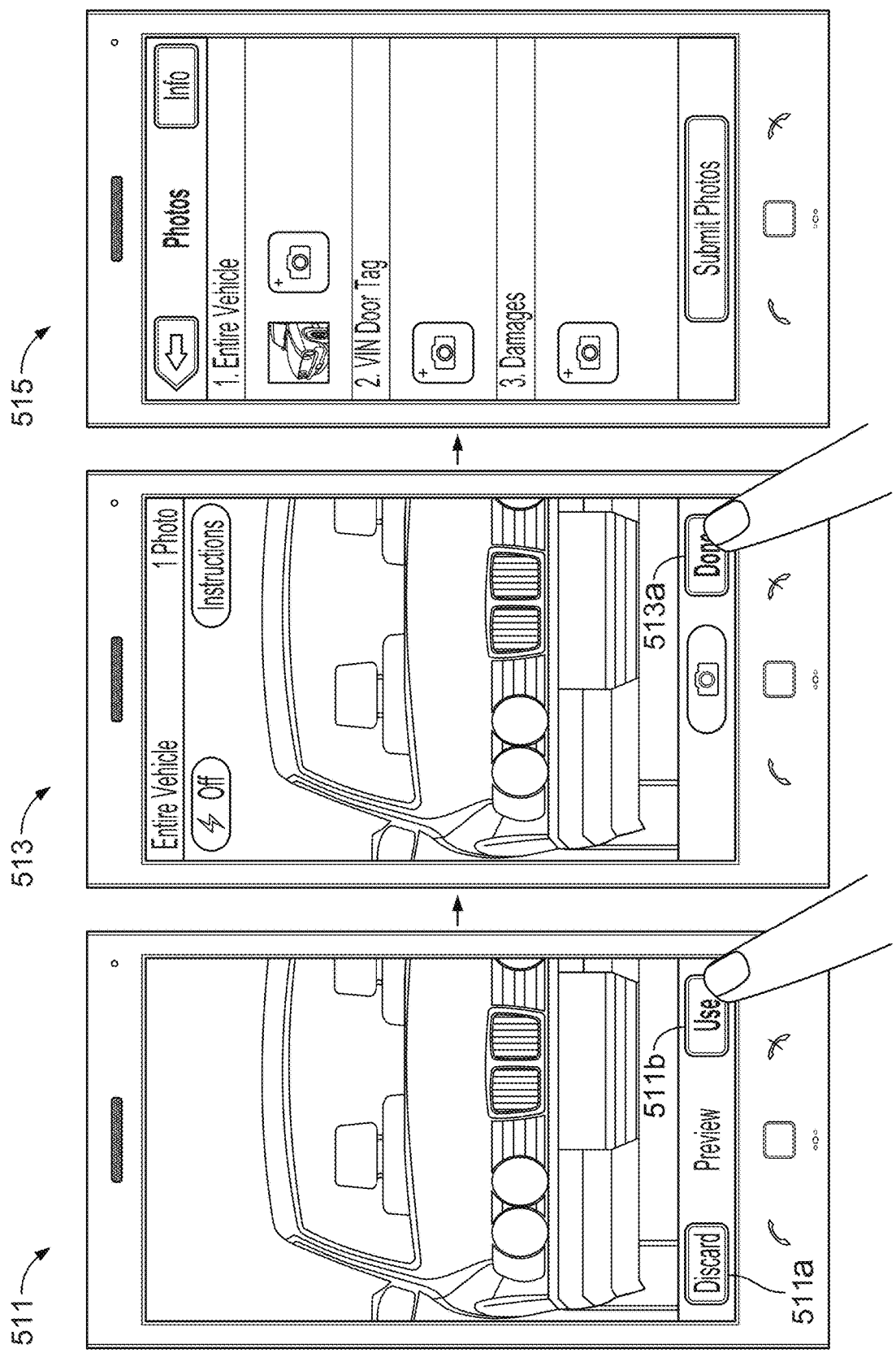
FIG. 5b shows a second series of display screens displayed on a mobile device as a user takes photos of a damaged vehicle in accordance with certain aspects of the present disclosure.

FIG. 5b shows a second series of display screens displayed on a mobile device as a user takes photos of a damaged vehicle in accordance with at least one aspect of the present disclosure. Screen 511 may allow a user to preview a photo that has been taken and take an appropriate action on this photo. In particular, the user may select a "Discard" button 511a to discard the photo or a "Use" button 511b to use the photo for damage assessment and claims processing. Assuming that the user selects "Use" button 511*b*, the user may proceed to take other photos within the selected photo type. When the user has taken all the photos of a given photo type, the user may select the "Done" button 513*a* on screen 513. After selecting the "Done" button 513*a* on screen 513, the mobile device may display screen 515, where thumbnail image(s) of the photo(s) that the user has already taken may be displayed in the corresponding categories.

Figure 6:
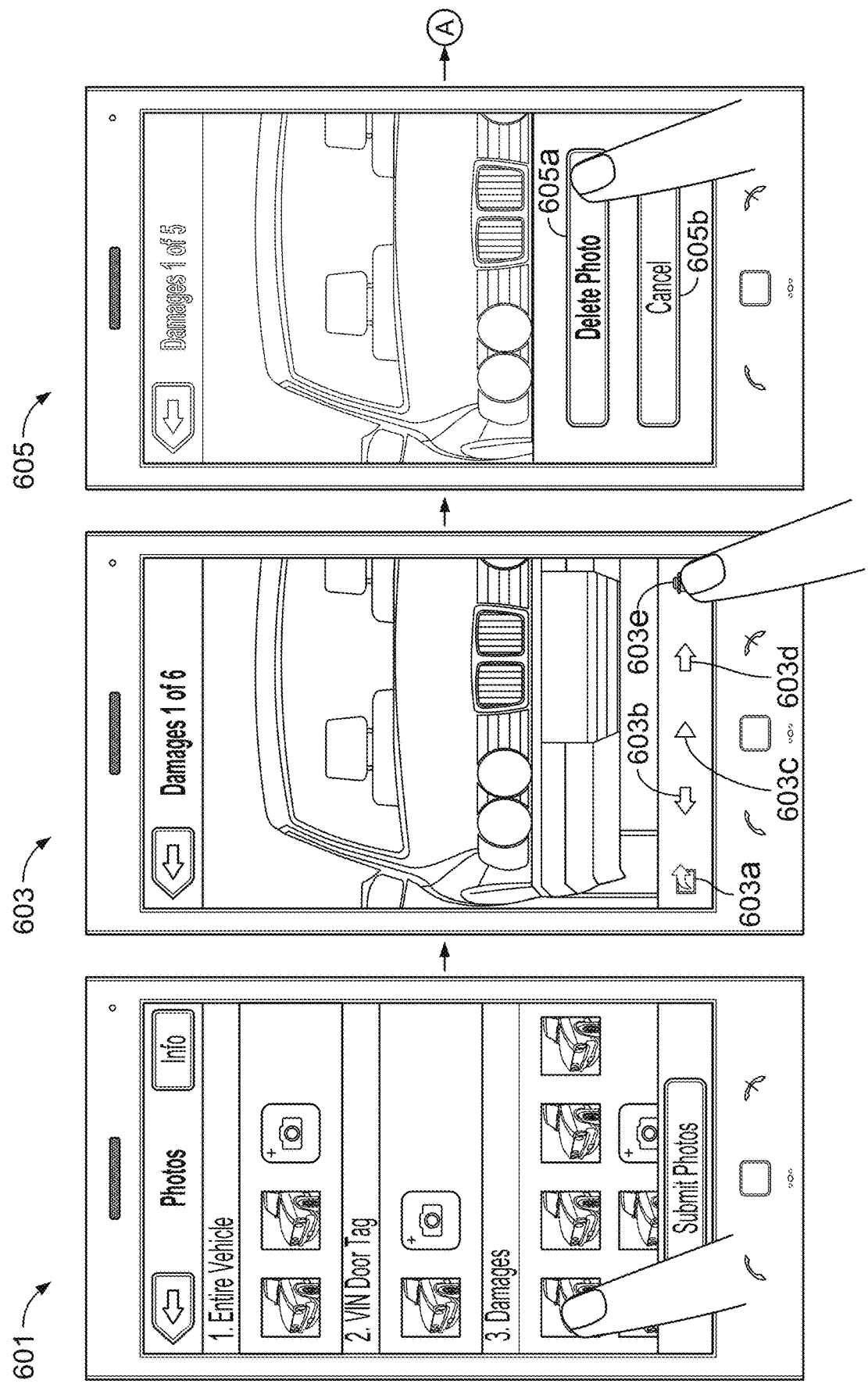
FIG. 6 shows a series of display screens displayed on a mobile device for enabling a user to delete photos that have already been taken in accordance with certain aspects of the present disclosure.
Figure 6:
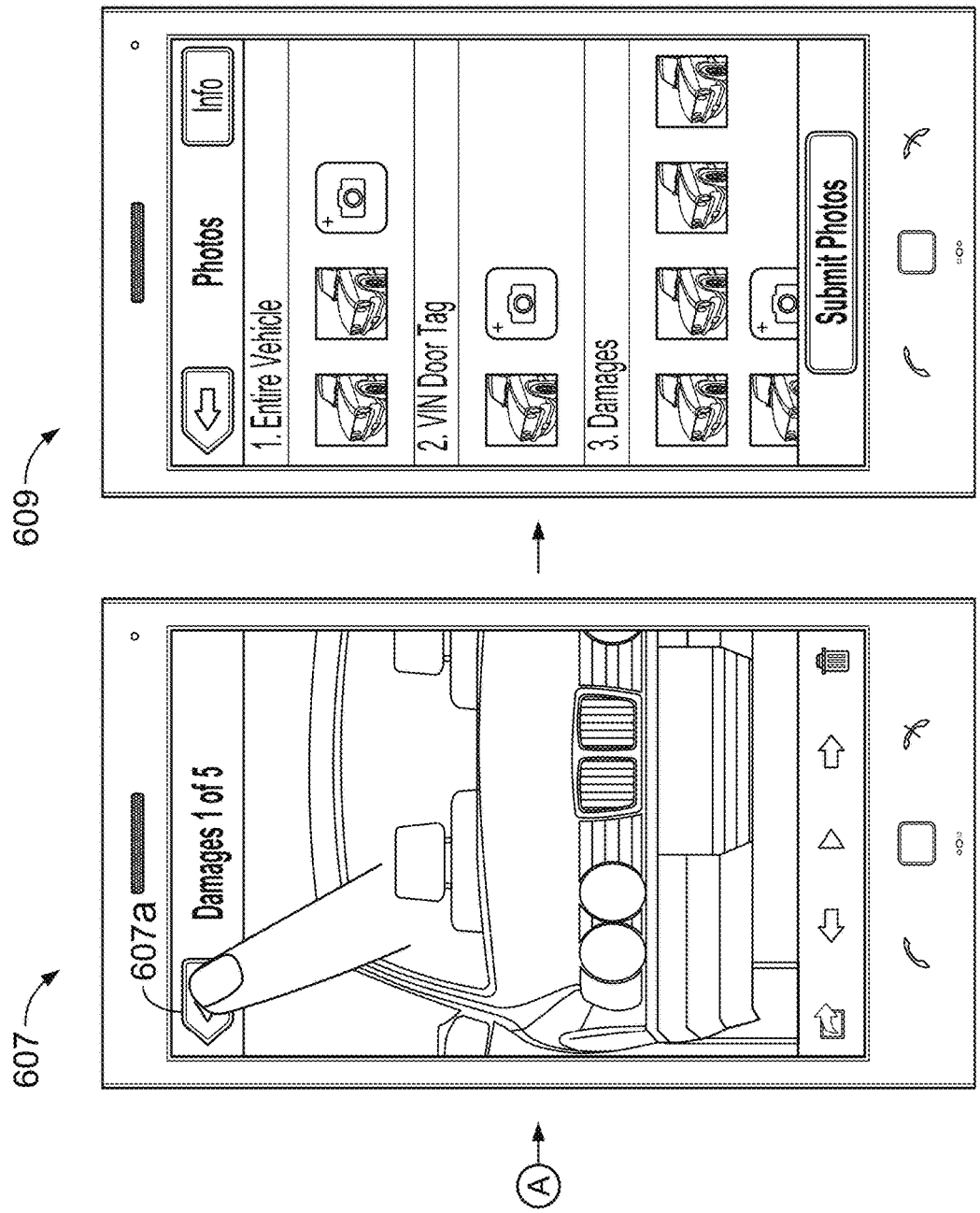

FIG. 6 shows a series of display screens displayed on a mobile device for enabling a user to delete photos that have already been taken in accordance with at least one aspect of the present disclosure. Screen 601 displays thumbnails of all photos that have already been taken. When a user selects one of the thumbnails in screen 601, the mobile device may display screen 603, where a series of buttons may be displayed, including an additional options button 603*a* for displaying additional options associated with the current photo (e.g., email photo, use photo as wallpaper, etc.), a scroll to previous photo button 603*b* for scrolling to the previously-viewed photo in the photo reel, a play photo reel button 603*c* for sequentially displaying each photo in the photo reel, a scroll to next photo button 603*d* for scrolling to the next photo in the reel, and a delete button 603*e* for deleting the currently-viewed photo. If the user selects delete button 603*e*, the photo currently displayed may be queued for deletion and mobile device may display screen 605. Screen 605 includes an action panel with a "Delete Photo" button 605*a* for confirming that the currently-viewed photo is to be deleted and a "Cancel" button 605*b* for cancelling deletion of the currently-viewed photo. If the user selects "Delete Photo" button 605*a*, the currently-viewed photo is deleted and the next photo in the current category is displayed in screen 607. If the user selects a back button 607*a* on screen 607, the user may back out to return to photos screen 609. Screen 609 may display the remaining thumbnails stored in a memory of the mobile device, with the image that the user deleted in screen 605 removed from the list of thumbnails.

Figure 7:
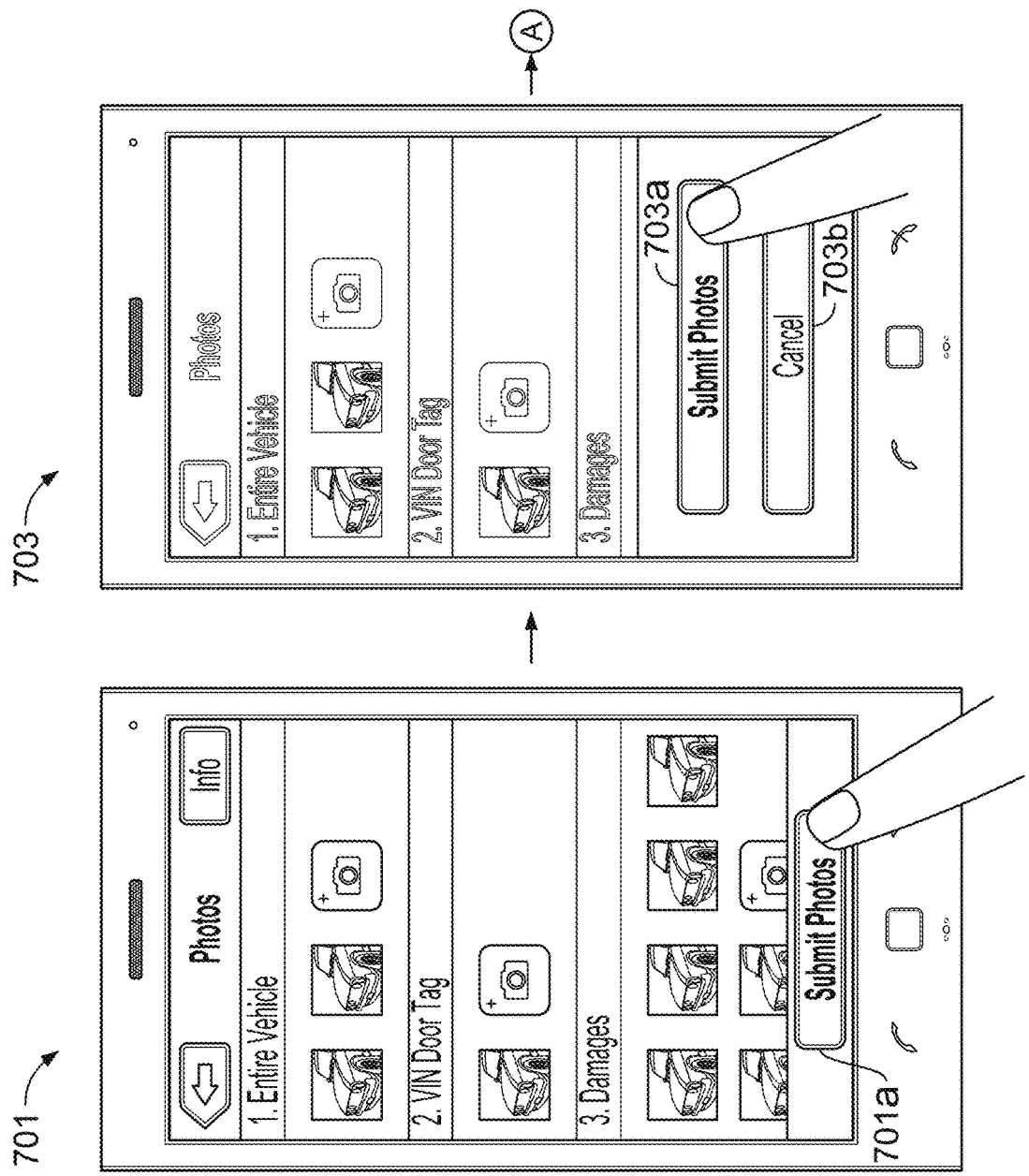
FIG. 7 shows a series of display screens displayed on a mobile device for enabling a user to submit photos for review by an enhanced claims processing server, in accordance with certain aspects of the present disclosure.
Figure 7:
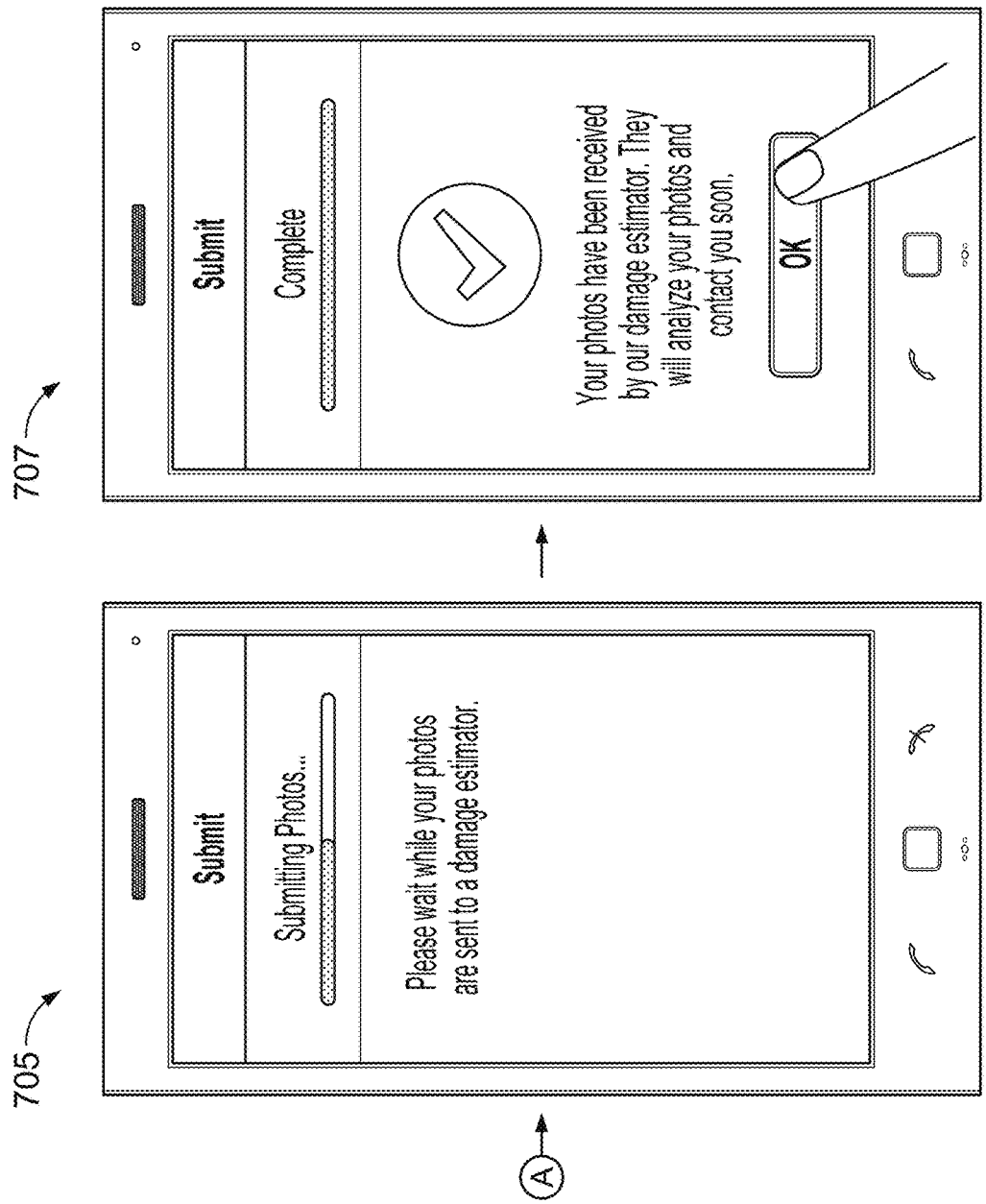

FIG. 7 shows a series of display screens displayed on a mobile device for enabling a user to submit photos for review by an enhanced claims processing server 101, in accordance with at least one aspect of the present disclosure. Screen 701 may include a "Submit Photos" button 701*a* for submitting photos to server 101 when all photos have been taken. When a user presses "Submit Photos" button 701*a*, the mobile device may display screen 703, which includes an action panel with the "Submit Photos" button 703*a* for confirming that the captured photos are to be submitted to server 101 and a "Cancel" button 703*b* for cancelling the submission. If the user selects "Submit Photos" button 703*a*, the mobile device may display screen 705 where an upload progress bar may indicate the progress of the photo upload. Once the photos have been fully uploaded, the mobile device may display screen 707, which indicates that the photos have been uploaded and explains any next steps that should be taken.

Figure 8:
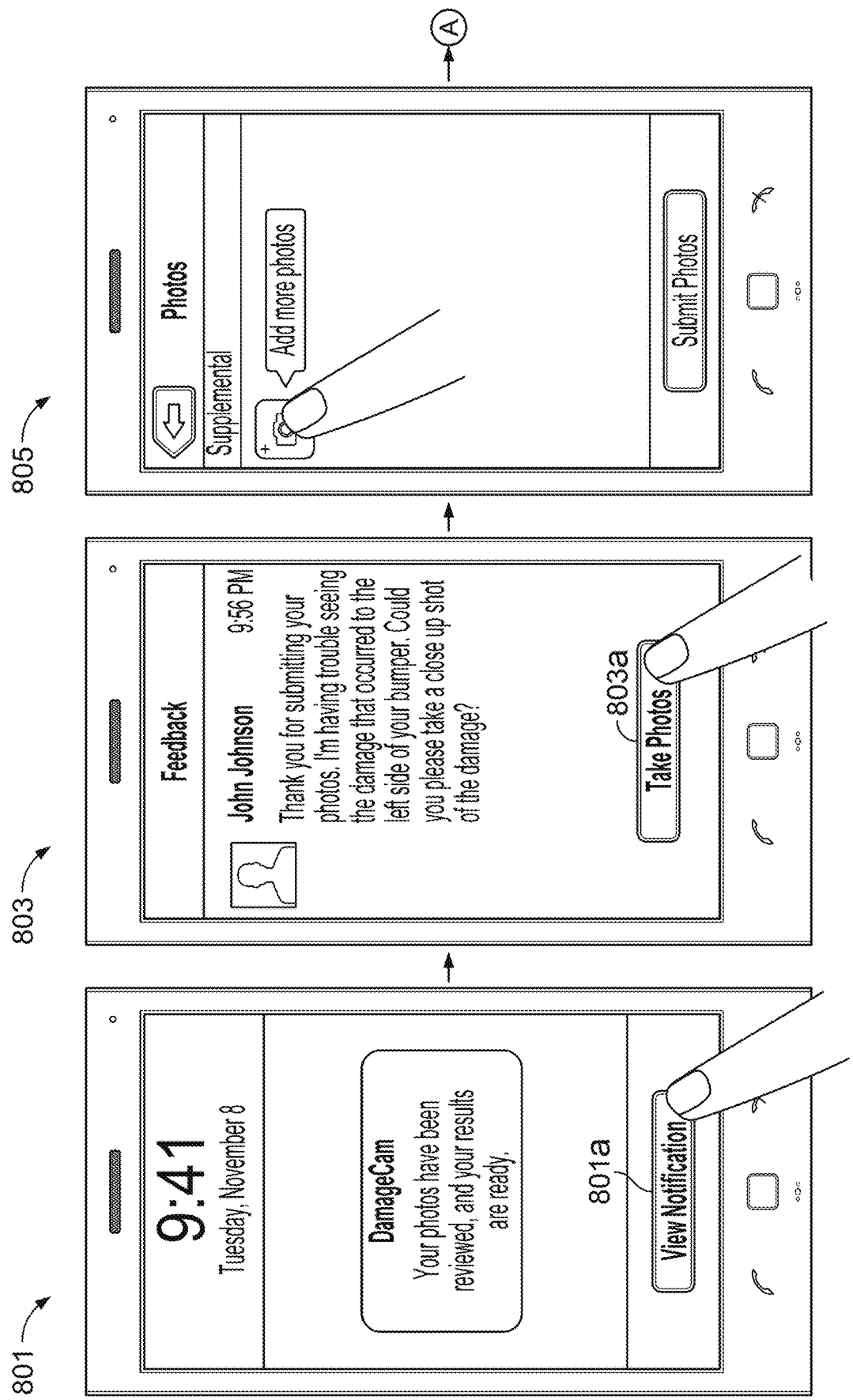
FIG. 8 shows a series of display screens displayed on a mobile device for enabling a user to receive feedback from an enhanced claims processing server regarding previously submitted photos, in accordance with certain aspects of the present disclosure.

FIG. 8 shows a series of display screens displayed on a mobile device for enabling a user to receive feedback from an enhanced claims processing server 101 regarding previously submitted photos, in accordance with at least one aspect of the present disclosure. When enhanced claims processing server 101 completes review of the photos submitted in FIG. 7, server 101 may transmit a notification to the mobile device that feedback is ready for review. When the mobile device receives the notification, screen 801, which includes a notification that feedback is ready, may be displayed. When a user selects the "View Notification" button 801*a*, the mobile device may display screen 803, which may include a detailed description of any feedback received from server 101. In this case, server 101 has transmitted a message that asks the user to take additional photos (e.g., of the damage to the left side of a bumper). Screen 803 may also include a "Take Photos" button 803*a* which may allow the user to take additional photos of the damaged vehicle. When the user presses "Take Photos" button 803*a*, the mobile device may display screen 805 which allows the user to take more photos of the damaged vehicle (e.g., in response to the feedback received in screen 803) using the same process depicted in FIGS. 5*a* and 5*b*.

Once all required photos have been taken, the user may press the "Submit Photos" button 807*a* in screen 807 to submit the photos taken via screen 805 to enhanced claims processing server 101. When the user presses the "Submit Photos" button 807*a* in screen 807, the mobile device may display screen 809, which includes a progress bar that shows the progress of the photo upload to server 101.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software but the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A method for remotely inspecting damage to an item using a handheld mobile computing device comprising:
   (a) providing an insurance claim application to a user for installation on a handheld mobile computing device;
   (b) receiving, at an enhanced claims processing server and from the insurance claim application, information associated with an insurance claim associated with damage to an insured item;
   (c) determining, at the enhanced claims processing server, whether the information is acceptable;
   (d) responsive to determining the information is acceptable, transmitting, by the enhanced claims processing server, one or more instructions to the insurance claim application indicating how to capture image data related to the damage to the insured item wherein the insurance claim application presents, at a display of the handheld mobile computing device, at least one of the one or more instructions;
   (e) receiving, at the enhanced claims processing server and from the insurance claim application, the image data related to the damage to the insured item, the image data having been captured by the handheld mobile computing device based on the one or more instructions transmitted to the insurance claim application;
   (f) automatically performing digital image analysis on the image data to determine, by a processor of the enhanced claims processing server, whether to accept the image data received;
   (g) responsive to determining not to accept at least a portion of the image data received, automatically repeating, by the enhanced claims processing server, steps (c)-(e) until determining to accept all of the image data received; and (h) upon determining that all of the image data received is accepted, automatically determining, by the enhanced claims processing server, an estimated cost to either repair the damage or replace the insured item using the image data, the determining of the estimated cost including:

(1) automatically performing, by the processor of the enhanced claims processing server, digital image conversion to at least one characteristic of the received image data, the at least one characteristic including grayscale conversion;

(2) automatically generating, by the enhanced claims processing server, filtered digital image data by applying one or more digital image filters to the received image data;

(3) automatically identifying, through the filtered digital image data, an extent of the damage to the insured item by comparing, by the processor of the enhanced claims processing server, the filtered digital image data to one or more reference digital images of previously assessed damaged items; and (4) automatically generating, by the enhanced claims processing server, the estimated cost based on a result of the comparing and cost data of one or more templates associated with the one or more reference digital images.

2. The method of claim 1, further comprising:
(i) determining, at the enhanced claims processing server, a settlement to settle the insurance claim based on the estimated cost.

3. The method of claim 2, further comprising:
(j) providing the settlement to the handheld mobile computing device from the enhanced claims processing server.

4. The method of claim 3, further comprising:
(k) receiving, at the enhanced claims processing server from the handheld mobile computing device, an indication of whether the settlement has been accepted.

5. The method of claim 4, further comprising:
(l) responsive to determining that the settlement has been accepted, transmitting, from the enhanced claims processing server to an account of a user associated with the insured item, a monetary amount indicated in the settlement.

6. The method of claim 4, further comprising:
(l) responsive to determining that the settlement has not been accepted, providing the settlement to a claims adjuster for manual processing of the insurance claim.

7. The method of claim 1, wherein:
determining whether to accept the image data received is based on a predetermined set of rules comprising a rule related to whether or not at least a portion of the image data received is too blurry for the image processing.

8. The method of claim 1, wherein:
the insured item comprises a vehicle, and wherein the one or more reference digital images includes depth map information of the previously assessed damaged items.

9. The method of claim 1, wherein:
the image processing includes applying at least one of stereoscopic techniques and analyzing three-dimensional video.

10. The method of claim 1, further comprising:
(i) storing, at a database of the enhanced claims processing server, a record of the insurance claim; and (j) responsive to determining to accept all of the image data received, storing the image data received at a data store of the enhanced claims processing server and associating the image data stored with the insurance claim record stored at the database.

11. The method of claim 1, further comprising:
transmitting, from the enhanced claims processing server to the handheld mobile computing device, a list of recommended repair shops for repairing damage to the insured item.

12. A non-transitory computer readable medium storing computer executable instructions that, when executed, cause an enhanced claims processing server to:

(a) provide an insurance claim application to a user for installation on a handheld mobile computing device;

(b) receive, from the insurance claim application, information associated with an insurance claim associated with damage to an insured item;

(c) determine, whether the information is acceptable;

(d) responsive to determining the information is acceptable, transmit one or more instructions to the insurance claim application indicating how to capture image data related to the damage to the insured item wherein the insurance claim application presents, at a display of the handheld mobile computing device, at least one of the one or more instructions;

(e) receive, at an image processor of the enhanced claims processing server and from the insurance claim application, the image data related to the damage to the insured item, the image data having been captured based on the one or more instructions transmitted to the insurance claim application;

(f) automatically perform digital image analysis on the image data to determine, by the image processor, whether to accept the image data received;

(g) responsive to determining not to accept at least a portion of the image data received, automatically repeat steps (c)-(e) until determining to accept all of the image data received; and (h) upon determining that all of the image data received is accepted, automatically determine an estimated cost to either repair the damage or replace the insured item, the determining the estimated cost including:

(1) automatically performing, by the image processor, digital image conversion to at least one characteristic of the received image data, the at least one characteristic including grayscale conversion;

(2) automatically generating, by the image processor, filtered digital image data by applying one or more digital image filters to the received image data; and (3) automatically identifying, through the filtered digital image data, an extent of the damage to the insured item by comparing, by the image processor, the filtered digital image data to one or more reference digital images of previously assessed damaged items; and (4) automatically generating the estimated cost based on a result of the comparing and cost data of one or more templates associated with the one or more reference digital images.

13. The non-transitory computer readable medium of claim 12, wherein the enhanced claims processing server is further caused to:

(i) determine a settlement to settle the insurance claim based on the estimated cost.

14. The non-transitory computer readable medium of claim 13, wherein the enhanced claims processing server is further caused to:
(j) provide the settlement to a computing device.

15. The non-transitory computer readable medium of claim 14, wherein the enhanced claims processing server is further caused to:
(k) receiving, from the computing device, an indication of whether the settlement has been accepted.

16. An enhanced claims processing server comprising:
a processor; and
memory storing computer executable instructions that, when executed, cause the enhanced claims processing server to:
(a) provide an insurance claim application to a user for installation on a handheld mobile computing device;
(b) receive from the insurance claim application, information associated with an insurance claim associated with damage to an insured item;
(c) determine whether the information is acceptable;
(d) responsive to determining the information is acceptable, transmit one or more instructions to the insurance claim application indicating how to capture image data related to the damage to the insured item wherein the insurance claim application presents, at a display of the handheld mobile computing device, at least one of the one or more instructions;
(e) receive from the insurance claim application, the image data related to the damage to the insured item, the image data having been captured by the handheld mobile computing device based on the one or more instructions transmitted to the insurance claim application;
(f) automatically perform digital image analysis on the image data to determine whether to accept the image data received;
(g) responsive to determining not to accept at least a portion of the image data received, automatically repeat steps (c)-(e) until determining to accept all of the image data received; and
(h) upon determining that all of the image data received is accepted, automatically determine, using the image data, an estimated cost to either repair the damage or replace the insured item, the determining the estimated cost including:
(1) automatically performing digital image conversion to at least one characteristic of the received image data, the at least one characteristic including grayscale conversion;
(2) automatically generating, by the processor, filtered digital image data by applying one or more image filters to the received image data;
(3) automatically identifying, through the filtered digital image data, an extent of the damage to the insured item by comparing the filtered digital image data to one or more reference digital images of previously assessed damaged items; and
(4) automatically generating the estimated cost based on a result of the comparing and cost data of one or more templates associated with the one or more reference digital images.

17. The enhanced claims processing server of claim 16, wherein determining whether to accept the image data received is based on a predetermined set of rules comprising a rule related to whether or not at least a portion of the image data received is too blurry for image analysis.

* * * * *